(12) United States Patent
Tanigawa et al.

(10) Patent No.: US 6,618,368 B1
(45) Date of Patent: Sep. 9, 2003

(54) DATA GATEWAY AND METHOD FOR RELAYING DATA

(75) Inventors: Keiko Tanigawa, Kawasaki (JP); Koji Tsukada, Tokyo (JP); Toru Hoshi, Yokohama (JP); Hiroshi Kanai, Atsugi (JP); Toshimitsu Hayashi, Kanagawa-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/252,283

(22) Filed: Feb. 18, 1999

(30) Foreign Application Priority Data

Feb. 19, 1998 (JP) .......................... 10-037562
Mar. 12, 1998 (JP) .......................... 10-061146

(51) Int. Cl.$^7$ .......................... H04L 12/66; H04L 12/28
(52) U.S. Cl. ..................... 370/352; 370/401
(58) Field of Search .................. 370/238, 252, 370/352, 354, 356, 389, 392, 393, 394, 401, 474, 475, 476, 466, 535, 537, 503, 509; 709/230, 224, 238, 241, 223, 226, 227

(56) References Cited

U.S. PATENT DOCUMENTS

| | | | | |
|---|---|---|---|---|
| 5,706,210 A | * | 1/1998 | Kumano et al. | 709/224 |
| 6,049,827 A | * | 4/2000 | Sugauchi et al. | 709/223 |
| 6,064,653 A | * | 5/2000 | Farris | 370/352 |
| 6,085,252 A | * | 7/2000 | Zhu et al. | 709/230 |
| 6,118,786 A | * | 9/2000 | Tiernan et al. | 370/538 |
| 6,198,738 B1 | * | 3/2001 | Chang et al. | 370/401 |
| 6,272,548 B1 | * | 8/2001 | Cotter et al. | 709/238 |
| 6,304,567 B1 | * | 10/2001 | Rosenberg | 370/401 |
| 6,308,216 B1 | * | 10/2001 | Goldszmidt et al. | 709/224 |
| 6,339,594 B1 | * | 1/2002 | Civanlar et al. | 370/352 |
| 6,347,078 B1 | * | 2/2002 | Narvaez-Guarnieri et al. | 370/238 |
| 6,347,085 B2 | * | 2/2002 | Kelly | 370/401 |

OTHER PUBLICATIONS

B. Subbiah and s. Sengodan, "User Multiplexing in RTP payload between IP Telephony Gateways," Internet Engineering Task Force, Aug. 21, 1998.

J. Rosenberg and H. Schulzrinne, Issues and Options for RTP Multiplexing, Internet Engineering Task Force, Oct. 1, 1998.

J .Rosenberg and H. Schulzrinne, "An RTP Payload Forma for User Multiplexing," Internet Engineering Task Force, Nov. 6, 1998.

Mark Handley, "GeRM: Generic RTP Multiplexing," Internet Engineering Task Force, Nov. 11, 1998.

* cited by examiner

Primary Examiner—Chau Nguyen
Assistant Examiner—Andy Lee
(74) Attorney, Agent, or Firm—Sofer & Haroun, LLP

(57) ABSTRACT

An audio gateway is provided for receiving an internet relay request and a number called in a call from a telephone via the internet. An audio data gateway is selected using the number called, and relay operations are performed with the selected destination audio data gateway. The relay audio data is multiplexed for streams based on multiple relay requests having the same relay destination so that the relay audio data in these streams are multiplexed into a single relay stream.

6 Claims, 31 Drawing Sheets

| LINE NUM-BER 1801 | ACTIVE 1802 | AVAIL-ABILITY 1803 | MAXI-MUM DELAY 1804 | OUTGOING PORT NUM-BER 1805 | INCOMING PORT NUM-BER 1806 | STREAM IDENTIFIER 1807 | DESTINATION GATEWAY ADDRESS 1808 | MULTI-PLEXED STREAM 1809 | STREAM IDENTIFIER 1810 | LOSS RATE 1811 | DELAY 1812 | ENCOD-ING METHOD 1813 |
|---|---|---|---|---|---|---|---|---|---|---|---|---|
| 0 | O | O | 300ms | 1630 | 2560 | 273 | 1.2.3.4 | O | 45 | 3% | 230ms | G.723.1 |
| 1 | O | O | 300ms | 636 | 628 | 176 | 96.25.6.14 | X | -1 | 2% | 170ms | G.723.1 |
| 2 | O | O | 500ms | 1540 | 4303 | 51 | 1.2.3.4 | O | 45 | 4% | 330ms | G.729 |
| 3 | X | X | | | | | | | | | | |
| - - - | | | | | | | | | | | | |

FIG. 16

DATA GATEWAY AND METHOD FOR RELAYING DATA

BACKGROUND OF THE INVENTION

The present invention relates to a multimedia communication system. More specifically, the present invention relates to an audio data gateway, an audio data relaying method, and a multiplexing format for the relaying of audio data.

There has been rapid growth of the Internet, which is based on TCP/IP. The WWW (World Wide Web), a global data communication system, has provided further acceleration to the widespread use of the Internet, and the transfer of multimedia data, including audio and image data, over the Internet has become commonplace.

Against this backdrop, communication systems referred to as Internet telephony are emerging to provide communication similar to telephones by connecting communication terminals to the Internet for sending and receiving real-time audio data. There have been increased efforts recently to unify communications over the Internet. In particular, there has been significant interest in Internet telephones where a phone call is made by using a standard telephone to access an access point on the Internet. The phone call goes from there to an access point that is near the person being called. From this access point, the call goes to the public telephone network. For example, if access points are set up at both Tokyo and Osaka, the phone charge for a call from Tokyo to Osaka would be made up of the phone charge from the user to the Tokyo access point and the phone charge from the Osaka access point to the person being called. This would be cheaper than using the public telephone network to make the call from Tokyo to Osaka. This type of service is expected to grow in the future. Internet telephony is presented in "Cheap calls using the Internet: Three minutes from Tokyo to Osaka for 55 yen" (Nikkei Communication, Feb. 3, 1997), and "Internet telephony and video phones" (PCWAVE, pg. 81, March 1997).

With the conventional communication systems described in the above references, if a single audio data gateway is used for multiple lines, gateway operations are performed by generating separate audio streams for each line. To send the audio data over the Internet, these communication systems must add to the audio data their own headers or headers as set forward by standards committees, as well as header information from the different communication protocol layers. Packets must then be formed from this data. The audio data itself is split up into very short packets, e.g., less than 100 ms. Thus, the size of the additional data becomes many times the size of the audio data. Multiple audio streams relayed to a particular target gateway will take up excessive bandwidth despite the fact that much of the added data in the streams is similar. As an example, we will look at packets based on the UDP/IP communication protocol widely used over the Internet and the RTP real-time communication protocol that has been proposed by the IETF (Internet Engineering Task Force), an industry standards association. In these packets, 30 ms of audio data (using G.723.1 encoding at 5.3 kbps) would take 20 bytes, the RTP header would take 2 bytes, the UDP header would take 8 bytes and the IP header would take 20 bytes. Thus, 40 bytes of header data is twice the size of the audio data. If different applications add additional header data to this, the bandwidth taken up by the header increases.

On the input side, analog audio data is converted to digital audio data, and digital audio data is converted to analog audio data on the output side. Since conversion between analog and digital data is performed in hardware, input/output operations between the hardware and the software must be performed, and this takes up CPU power. In general, input/output operations between hardware and software take up a few milliseconds. When generating packets at 20 ms intervals, input/output operations take place 50 times a second per line. Since each operation takes a few milliseconds, the processing time required for 50 input/output operations is at least 100 ms. If there are multiple active lines, the input/output operations will be more frequent. This is a significant factor in audio communications, which must be performed in real time.

An object of the present invention is to provide a data gateway and a data relaying method that can reduce the bandwidth used by multiple streams having the same destination by multiplexing data that can be shared such as header data.

Another object of the present invention is to provide a data gateway and a data relaying method that can reduce the number of input/output operations between hardware and software that require CPU power for streams that can be multiplexed.

Yet another object of the present invention is to provide a data gateway and a data relaying method where, if multiple streams have the same destination gateway and can be multiplexed, a gateway that handles multiple lines can negotiate with a destination gateway to determine whether to perform multiplexing and whether the destination gateway supports multiplexing.

Yet another object of the present invention is to provide a multimedia communication system that uses the audio data gateway described above.

Yet another object of the present invention is to provide a control unit that uses the audio data gateway described above and that performs administrative tasks for the audio data gateway device.

OBJECT AND SUMMARY OF THE INVENTION

In order to achieve the objects described above, the present invention provides an audio data gateway that includes: means for receiving an Internet relay request and a number called in a call from a telephone via the Internet, selecting a destination audio data gateway using the number called, and performing relay operations with the selected destination audio data gateway; and means for multiplexing relay audio data for streams based on multiple relay requests having the same relay destination, i.e. streams bound for the same destination and having common data so that the relay audio data in these streams (the non-shared data of these streams) are multiplexed into a single relay stream.

In this communication system, a plurality of relay streams are multiplexed into a single relay stream. This makes it possible to conserve more bandwidth compared to relaying each relay stream independently.

Also, the hardware for performing analog/digital conversion of audio data includes means for performing batch transfer to higher-level software of multiple sets of converted audio data that are bound for the same relay destination.

Since this communication system performs input and output operations between hardware and software all at once, the number of input and output operations, which require CPU power, can be reduced and more lines can be handled.

In the audio data gateway according to the present invention, the packet format for multiplexed streams includes at least an identifier to indicate whether the packet is a multiplexed stream, as well as means for negotiating with the destination on whether multiplexing is to be performed when a new stream is created. This audio data relaying system also includes a control unit for performing administrative operations on the audio data gateway. The control unit includes: means for monitoring, which monitors proper operation of the audio data gateways; relay logs (the phone numbers of users who made calls, the phone numbers called, the times at which calls were begun, the times at which calls were terminated, and the like) for each audio data gateway; means for periodically collecting relay packet loss and relay packet delays; and means for sending scheduling information for each audio data gateway.

In the data relaying method according to the present invention, a request for a call and a telephone number to call are received from a telephone. Using the number being called, the gateway closest to the destination is found and the address of the resulting destination gateway is obtained. A connection request is established using the address of this gateway. Analog audio data from the telephone is converted into digital data. The converted digital data is placed in packets and relayed to the destination gateway. The relaying to the destination gateway is performed by: temporarily storing the converted digital data; when multiplex timing is reached, the stored digital data is retrieved and streams bound for the same destination gateway are multiplexed into a single packet.

The present invention also provides a method for connecting points on a public telephone network using the Internet and relaying data streams using IP packets. During the relaying of a plurality of audio data streams, if streams bound for the same destination IP address are created, negotiations are performed with the destination audio gateway to determine if the streams should be relayed in a multiplexed manner. If multiplexing is to be performed as a result of the negotiation, multiplexed data is generated and sending and receiving of data takes place.

In the data gateway of the present invention, if relay data is being sent and received using UDP and a new connection request is generated, the connection establish module includes means for assigning UDP ports assigning a separate UDP port to the data stream distinct from those of the existing data streams. The communication relay process module includes means for selecting a UDP port to send and receive multiplexed data if multiplexable data streams bound for the same destination data gateway are present in the plurality of data streams.

The UDP port is selected from one of the data streams containing the data to be multiplexed. The communication relay process module also includes means for s sending the multiplexed data using the selected UDP port. The data gateways sends and receives data using a single UDP port for each remote gateway regardless of whether the data is multiplexed or not.

The present invention also provides a data gateway used in a communication system having a plurality of gateways for transferring data. Each gateway includes means for acquiring addresses wherein: data relay requests and information indicating relay destinations are received from other gateways; this relay destination address is used to find the closest remote gateway; and the address of the found destination gateway is acquired. Means for establishing connection establishes connections using this destination gateway. Means for is relaying generates packets from the data requested to be relayed and relays these packets to the destination gateway. This means for relaying to gateways includes an input buffer for receiving and temporarily storing the converted data. Means for acquiring time acquires time information. Means for acquiring multiplex timing determines whether multiplex timing has been reached based on the time acquired through means for acquiring time. When means for acquiring multiplex timing determines that this multiplex timing has been reached, means for performing multiplexing retrieves all the data stored in the input buffer and multiplexes streams having the same destination gateway into the same packets. This means for performing multiplexing includes: means for sending the multiplexed packets over the Internet; means for receiving packets from the Internet; means for disassembling the data received by the receiving means into separate streams if the data contains multiplexed packets; and an output buffer for temporarily holding the streams data disassembled by the means for disassembling.

The data gateway according to the present invention also includes interfaces connected to a plurality of communication lines. From the multiple streams received via these interfaces, a retriever uses the information specifying the destinations of these streams to determine destination gateways. A communication relay process module multiplexes parts of packets from streams determined by the retriever to have the same destination gateway. The partially multiplexed packets are sent to the destination gateway.

The communication relay process module of the data gateway according to the present invention includes a buffer for temporarily storing incoming data and timing acquisition means acquiring time information used as a basis for multiplex timing. Data is read from the buffer based on this timing acquisition means to perform multiplexing.

The present invention also provides a data relay system including a data gateway and a control unit. The control unit includes: means for acquiring data entered by a user indicating the number of data gateways connected to the data relay system to be administered; means for creating IP packets from commands containing the number of data gateways acquired through this acquiring means; and means for sending the number of data gateways, formed as packets by this means for creating IP packets, to each data gateway.

The data gateways include: means for receiving IP packets from the control unit indicating the number of data gateways; means for analyzing IP packet data received from this receiving means; means for reserving a port for sending and receiving multiplex data for each audio data gateway if the IP packet analyzed by this analyzing means contains the number of audio data gateways; means for saving at least the ports used for sending and receiving multiplexed data in association with the destination data gateways these ports are for; means for acquiring a multiplex UDP port corresponding to a relay destination data gateway if a new relay request is generated and the stream is determined to be a multiplexed stream as a result of multiplex negotiation with the destination data gateway; means for sending and receiving data using the multiplex port set up for each relay destination data gateway as obtained from this means for acquiring a multiplex UDP port.

The data relay program used by the data relay system is stored and distributed in a storage medium.

BRIEF DESCRIPTION OF THE DRAWINGS

While the present invention has been described in detail and pictorially in the accompanying drawings it is not limited to such details since many changes and modifications recognizable to those of ordinary skill in the art may be made to the invention without departing from the spirit and the scope thereof. Other objects and advantages of the present invention will be apparent from the following detailed description of the presently preferred embodiments thereof, which description should be considered in conjunction with the accompanying drawings in which:

FIG. 16 is an example of a connection management table from the sixth embodiment.

DESCRIPTION OF THE PREFERRED EMBODIMENTS

The preferred embodiments of the present invention will be explained in detail with reference to the accompanying drawings.

The following is a description of a first embodiment of the present invention with references to FIG. 1 through FIG. 6 and FIG. 25 through FIG. 35.

Figure 1:
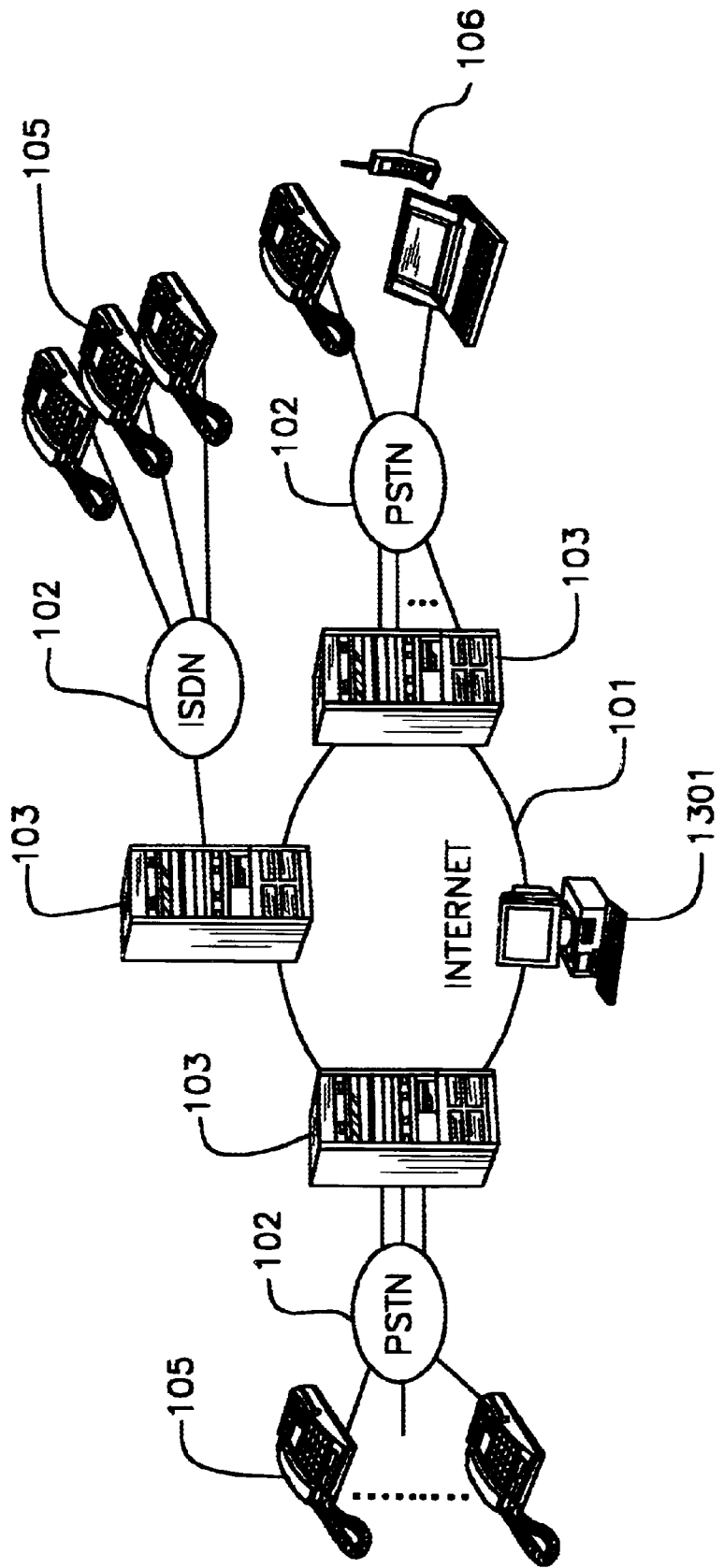
FIG. 1 is a drawing showing the overall structure involved in an audio data gateway according to the first embodiment of the present invention.

FIG. 1 shows a sample configuration for an audio data gateway according to the first embodiment of the present invention.

In FIG. 1, a gateway 103 is connected between an Internet 101 and a public telephone network 102 , and a telephone 104 or a communication terminal 105 is connected to the public telephone network. A control unit 1301 will be described in a later embodiment rather than in this embodiment.

Figure 2:
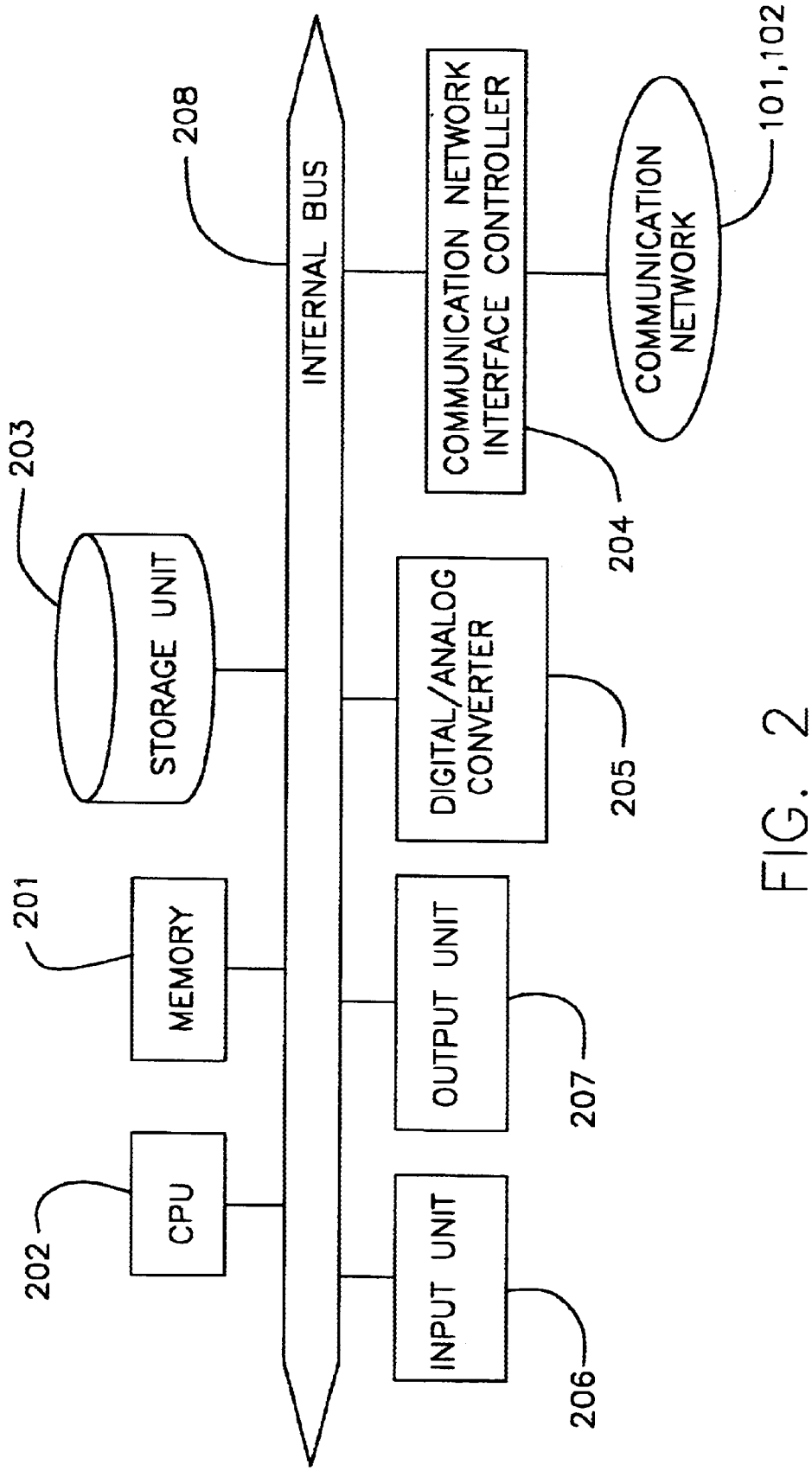
FIG. 2 is a structural drawing of a gateway.

FIG. 2 shows the internal structure of the gateway 103.

In FIG. 2, the gateway 103 includes: a memory 201 storing communication programs and the like; a CPU 202 performing processing based on programs in the memory 201; a storage device 203; a communication network interface controller 204 performing communication with the Internet 101 and the public telephone network 102; a digital/analog converter 205 converting analog audio data received from the telephone 104 of the caller into digital data, and converting digital audio data received from the gateway 103 at the relay destination into analog audio data; and an internal bus 206 that connects these elements.

The storage device 203 contains, at a minimum, gateway addresses and the associated phone numbers in the area handled by the gateway. CPU 202 executes the communication programs in the memory 201 to implement the functions of the process modules 300 in FIG. 3.

Figure 3:
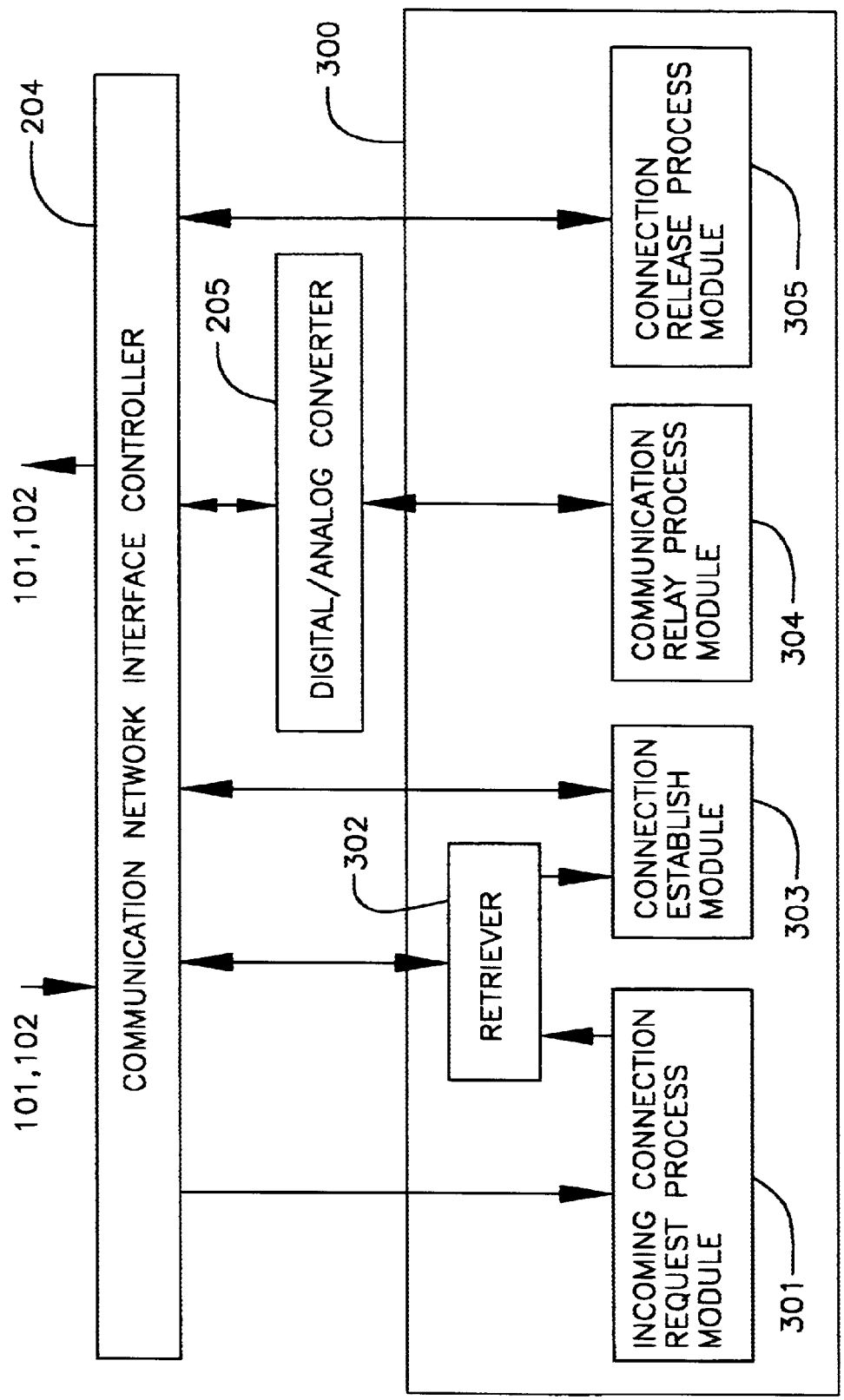
FIG. 3 is a structural drawing of the communication controller of the gateway.

In FIG. 3, the communication controller 300 of the gateway 103 includes: an incoming connection request process module 301; a connection establish module 303; a communication relay process module 304; and a connection release process module 305.

In the communication controller 300, the incoming connection request process module 301 gets the telephone number of the party being called when telephone 104 accesses the gateway via the public telephone network 102. When a communication relay request is received, the retriever 302 takes the phone number for the destination telephone 104 contained in this connection request and searches the storage device 203 for the address of the gateway that handles the destination terminal. The connection establish module 303 establishes the connection with the gateway for the communication relay destination based on the address data retrieved by the retriever 302. The communication relay process module 304 relays the audio data that has been digitized by the digital/analog converter 205 to the communication relay destination gateway 103. The connection release process module 305 ends communication relaying operations and terminates the connection when a communication release notification is received.

Figure 4:
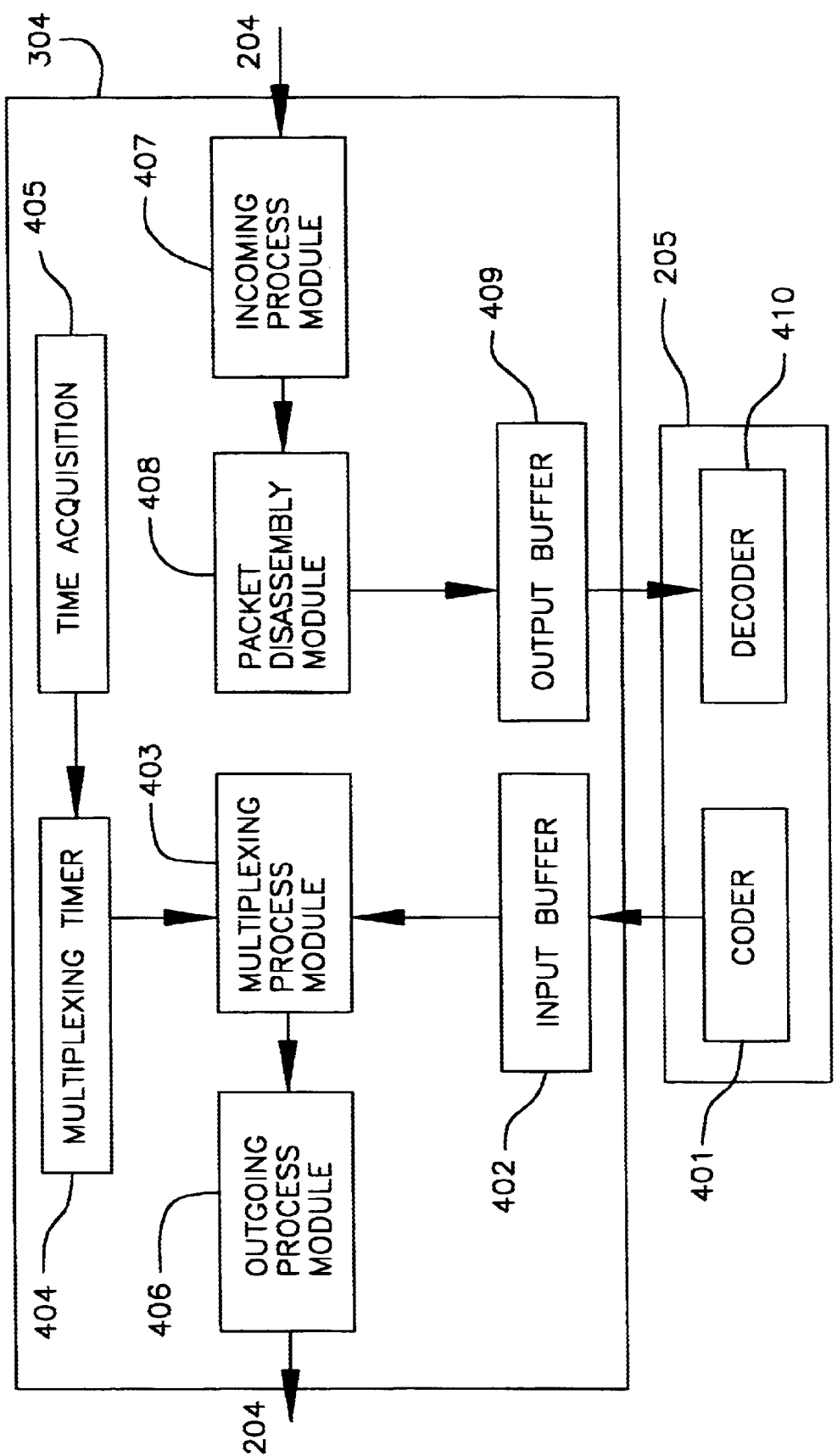
FIG. 4 is a structural drawing of the communication relay process module of the gateway.

FIG. 4 shows the internal structure of the communication relay process module 304 described above.

In FIG. 4, the communication relay process module 304 includes: an input buffer 402 providing temporary storage of digital data received from the digital/analog converter 205; a multiplexing process module 403 multiplexing the data stored in the input buffer 402 that have a common destination; a multiplexing timer 404 saving the timing used to execute the multiplexing operation; a time acquisition module 405 retrieving current time data used by the multiplexing timer 404; an outgoing process module 406 sending multiplexed stream data or multiple streams to the Internet 101 via the communication network interface controller 204; an incoming process module receiving data from the Internet 101 via the communication network interface controller 204; a packet disassembly module 408 disassembling incoming data into streams if the data is a multiplexed stream; and an output buffer 409 providing temporary storage for data disassembled into streams by the packet disassembly module 408 before it is sent to the digital/analog converter 205.

The digital/analog converter 205 includes: a coder 401 converting analog data to digital data and performing compression; and a decoder 410 uncompressing the compressed digital data and converting it to analog data.

FIG. 25 through FIG. 31 show sample packet formats for the relay audio data stored in the IP packets sent and received by the gateway 103.

Figure 25:
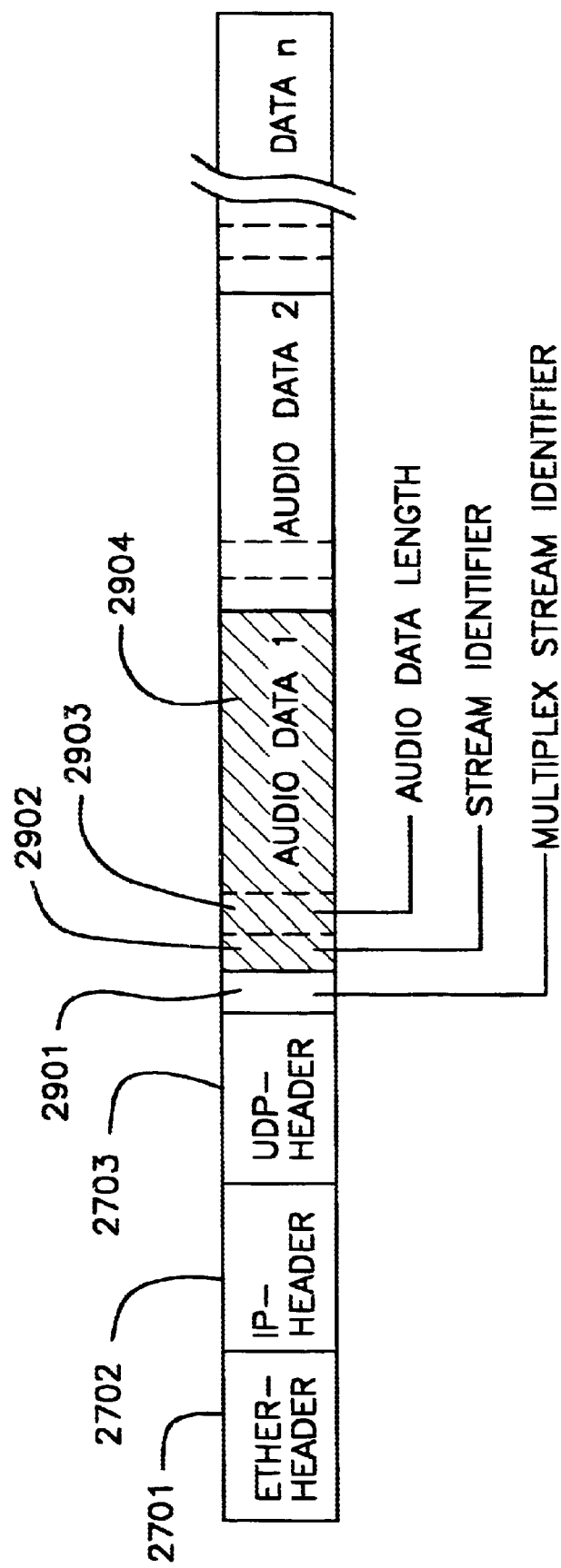
FIG. 25 is an example of a relay audio packet format for the first through eighth embodiments.

FIG. 25 shows a sample relay audio packet format.

In FIG. 25, header data 2901 is added by the hardware when this packet is sent over a network. For example, if connection is via Ethernet, an Ethernet header is added. A header 2902 is the header added by the IP layer. A header 2903 is the header added by the UDP layer. An identifier 2904 indicates whether this relay audio packet contains multiplexed audio data. Identifier 2905 is the identifier for the multiplexed stream. Audio data size 2906 indicates the length of the multiplexed data. Audio data 2907 is the multiplexed audio data. Audio data is provided as the set of elements 2905 through 2907 form. These sets are connected together, with one set for each multiplexed stream.

Figure 26:
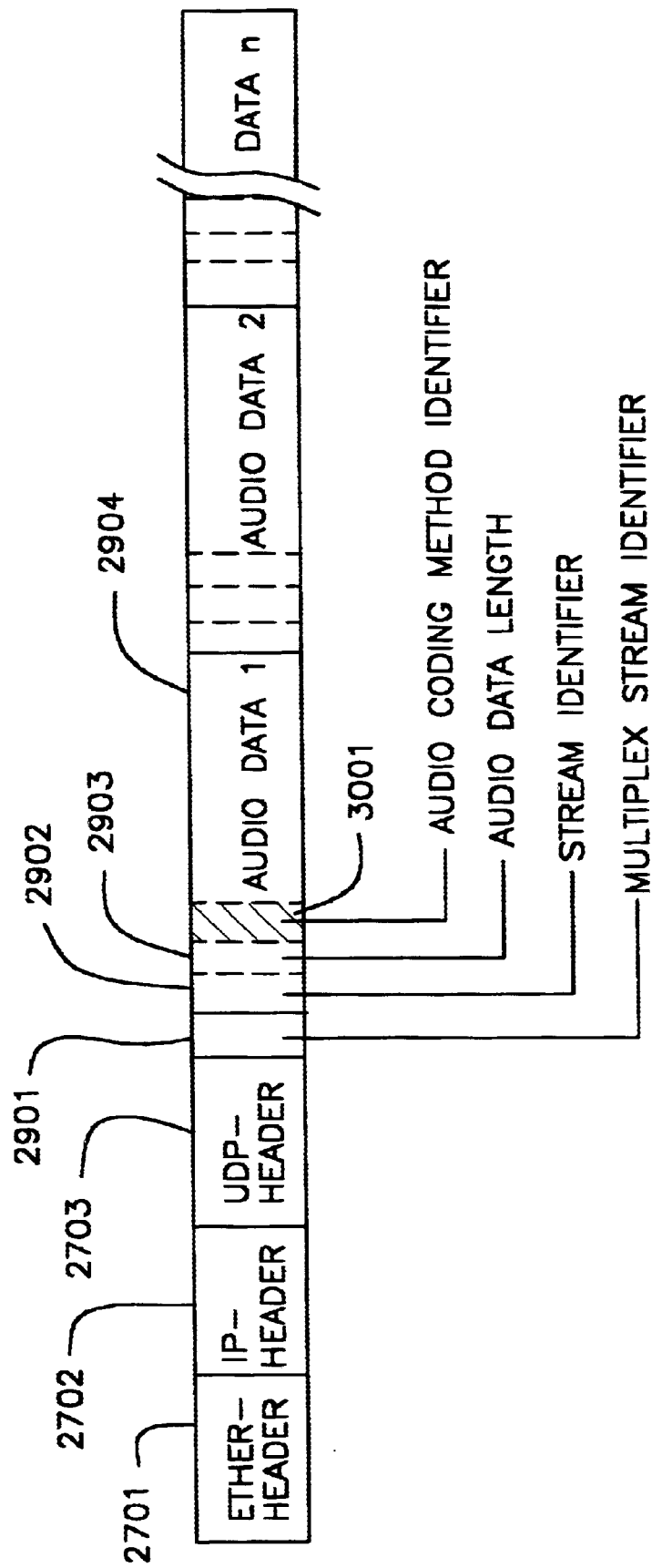
FIG. 26 is an example of a relay audio packet format for the first through eighth embodiments.
Figure 27:
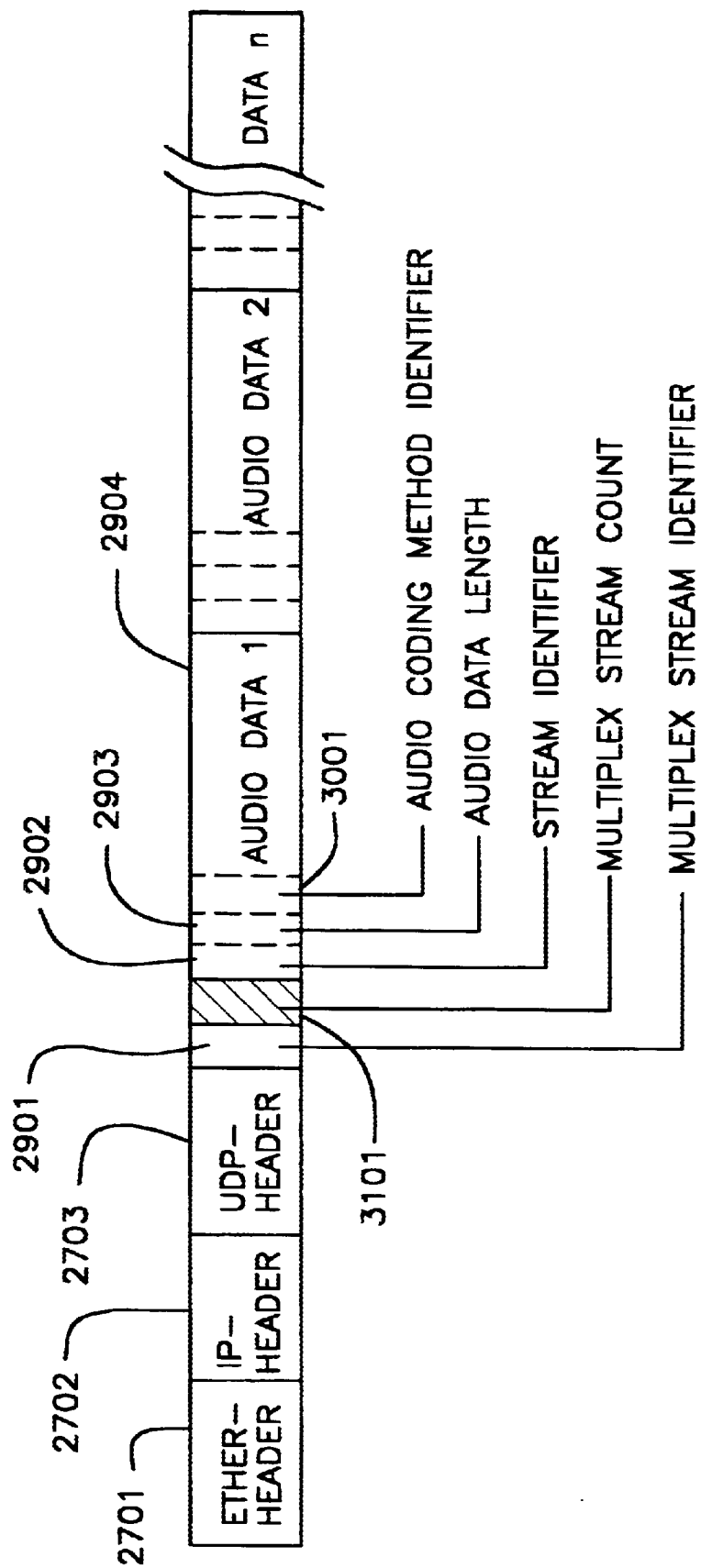
FIG. 27 is an example of a relay audio packet format for the first through eighth embodiments.

FIG. 26 shows an alternate format to the relay audio packet format shown in FIG. 25. An identifier 3001 indicates the encoding method used for the multiplexed audio data. FIG. 27 shows a relay audio packet format that is an alternative to the formats shown in FIG. 25 and FIG. 26. A stream count 3101 indicates the number of multiplexed streams in the relay audio packet.

Figure 28:
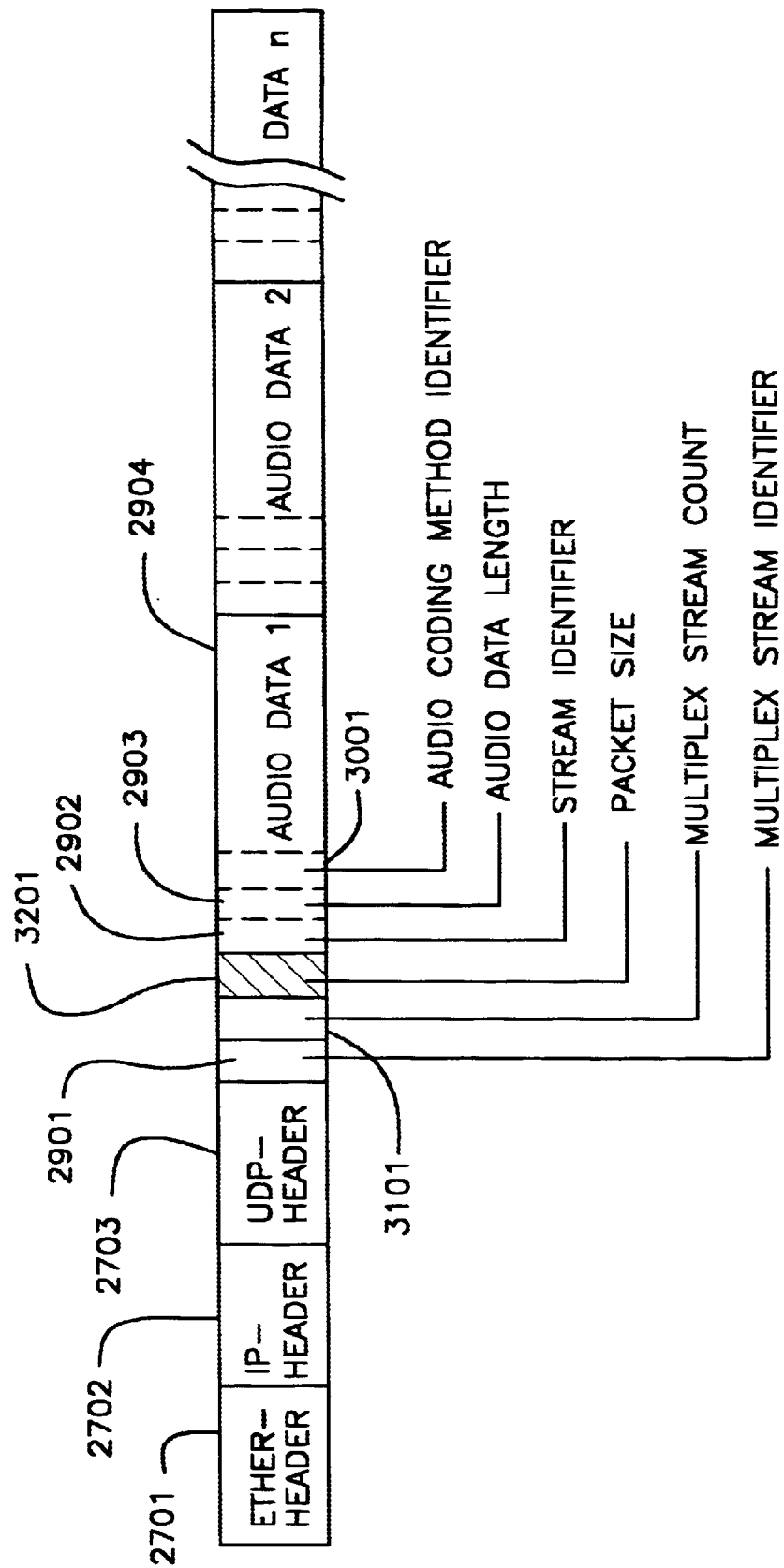
FIG. 28 is an example of a relay audio packet format for the first through eighth embodiments.

FIG. 28 shows a relay audio packet format that is an alternative to the formats shown in FIG. 25 through FIG. 27.

Figure 29:
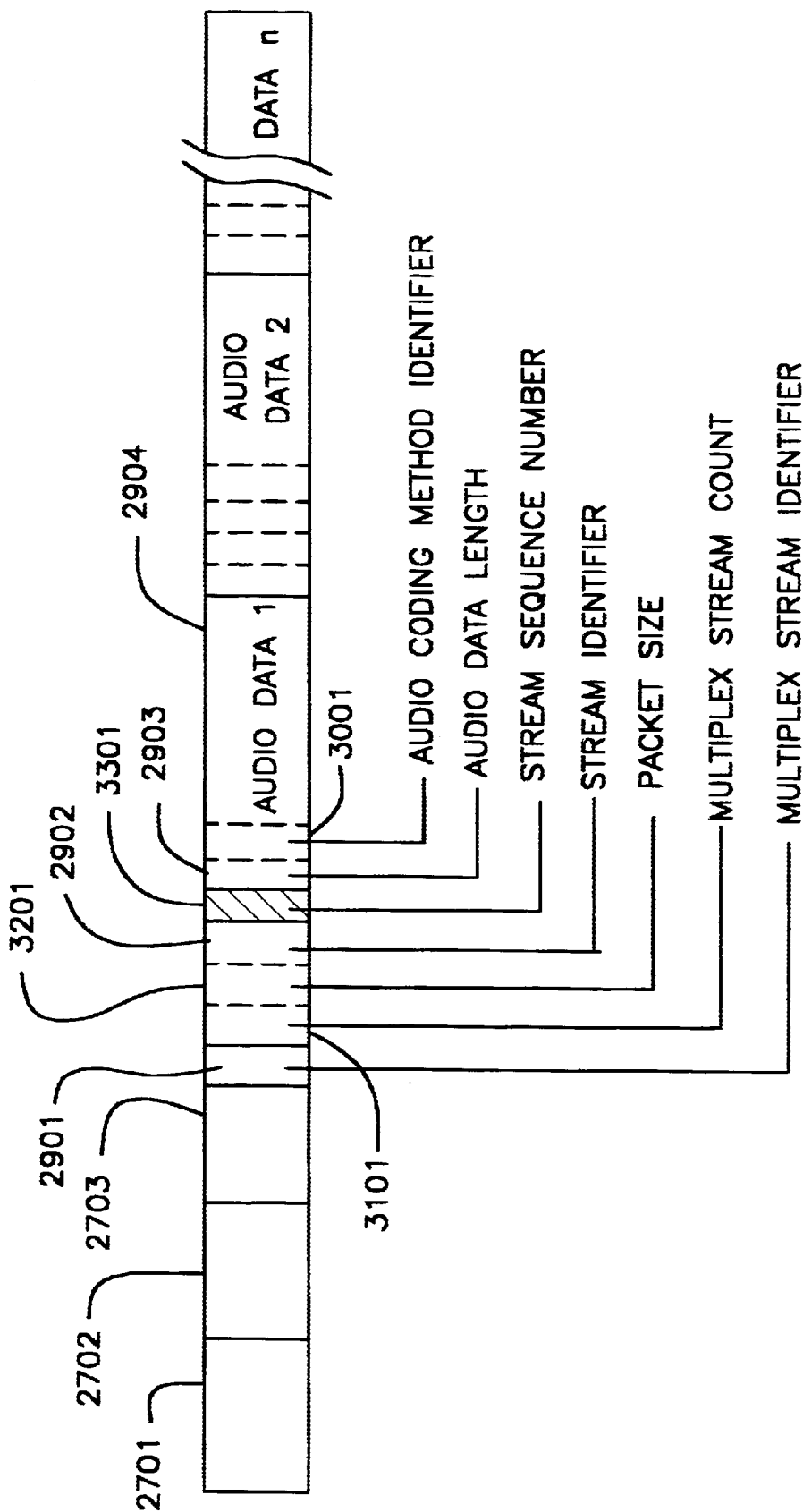
FIG. 29 is an example of a relay audio packet format for the first through eighth embodiments.

A packet size 3201 indicates the size of the relay audio packet. This packet size does not need to include the headers 2701 through 2703. FIG. 29 shows a relay audio packet format that is an alternative to the formats shown in FIG. 25 through FIG. 28. A sequence number 3301 indicates the sequence number in the multiplexed audio stream in the relay audio packet.

Figure 30:
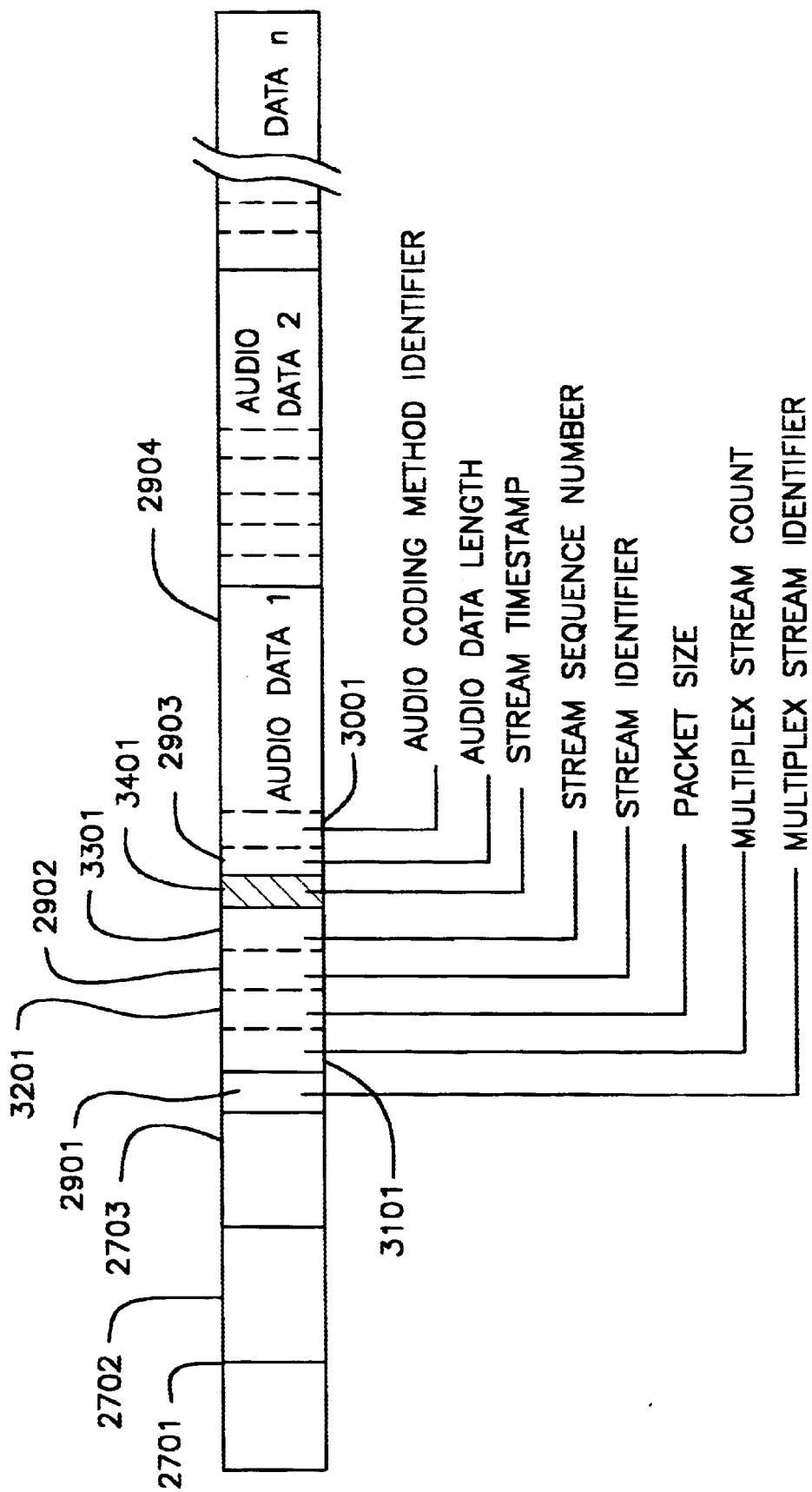
FIG. 30 is an example of a relay audio packet format for the first through eighth embodiments.

FIG. 30 shows a relay audio packet format that is an alternative to the is formats shown in FIG. 25 through FIG. 29. A timestamp 3401 contains a timestamp for the multiplexed stream in the relay audio packet.

Figure 31:
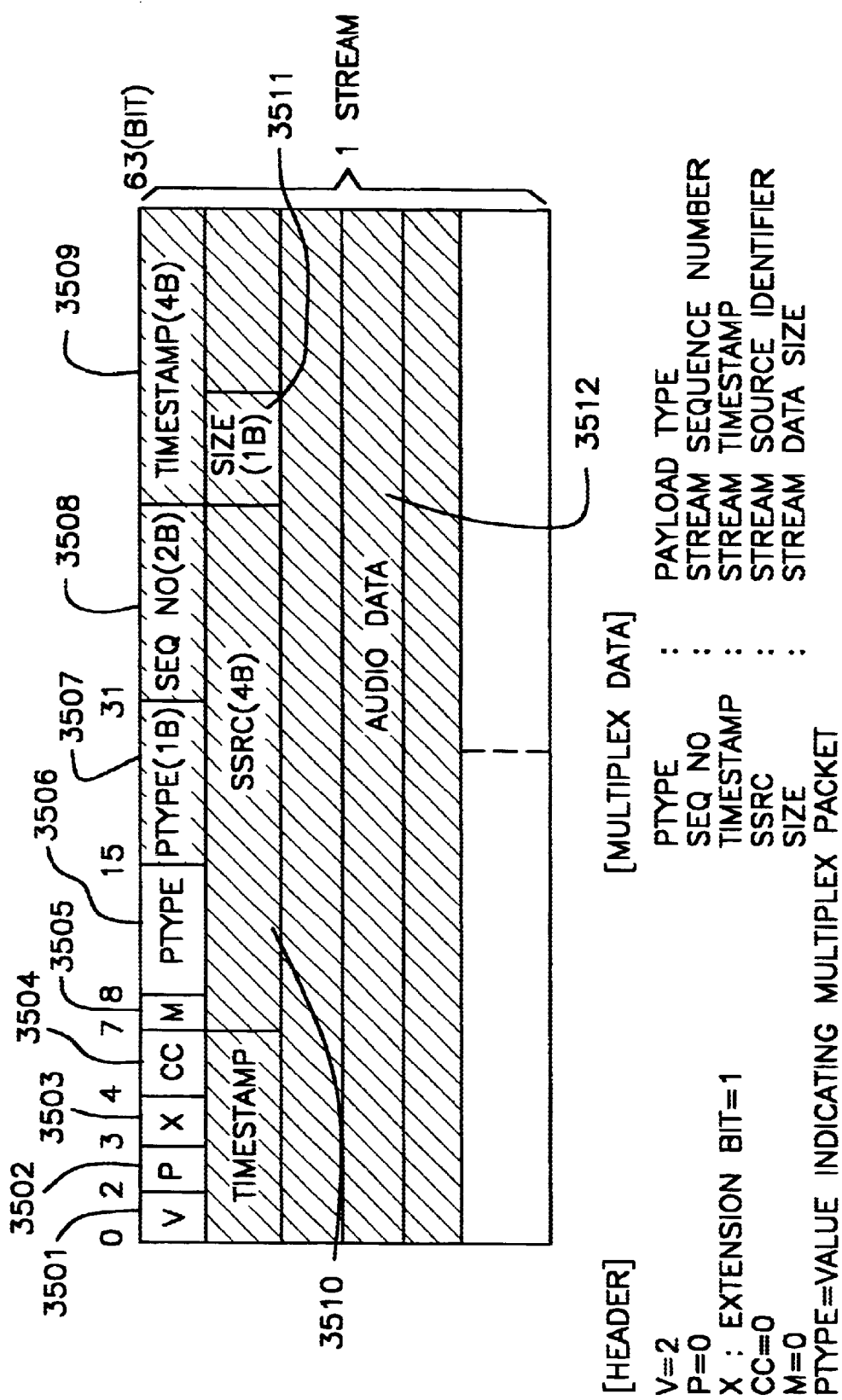
FIG. 31 is an example of a relay audio packet format for the first through eighth embodiments.

FIG. 31 shows a relay audio packet format that is an alternative to the formats shown in FIG. 25 through FIG. 30. This relay audio packet format is based on the RTP real-time protocol defined by the IETF industry standards association. A header 3501 contains RTP version information. A header 3502 indicates whether there is padding data in this RTP packet. Header 3503 indicates whether an extended header is used in this RTP packet. A header 3504 indicates the number of participating hosts in a multicast environment. A header 3505 is a marker bit. A header 3506 indicates the payload type of the data stored in the RTP packet. For multiplexed packets, the payload type indicates that a multiplexed stream is used. Headers 3501–3506 are part of the standard RTP format. Areas 3507 through 3512 are for individual multiplexed streams, and areas 3507 through 3512 are repeated based on the number of multiplexed streams. The area 3507 indicates the payload type of the audio stream (primarily used for the encoding method). For example, if audio data or image data is being carried, the encoding method is indicated. The area 3508 indicates the sequence number of the audio stream. The area 3509 indicates the timestamp of the audio stream. The area 3510 contains an identifier for the sender of the audio stream. The area 3511 contains the size of the audio data in the stream. The area 3512 contains the audio data for the audio stream. UDP, IP, and network headers are prepended to the header 3501.

Figure 5:
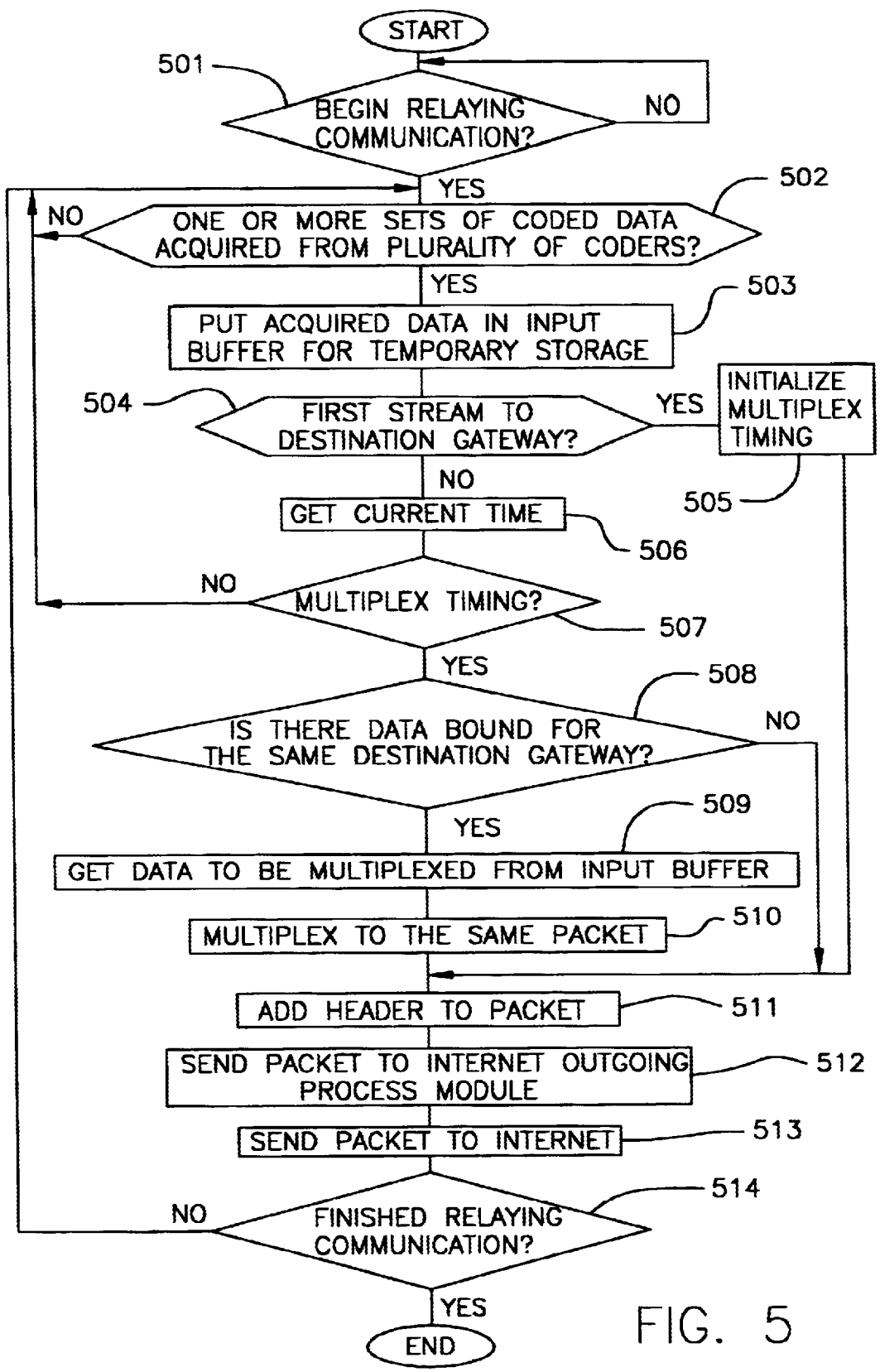
FIG. 5 is a flowchart of the operations performed by the communication relay process module of the gateway.
Figure 6:
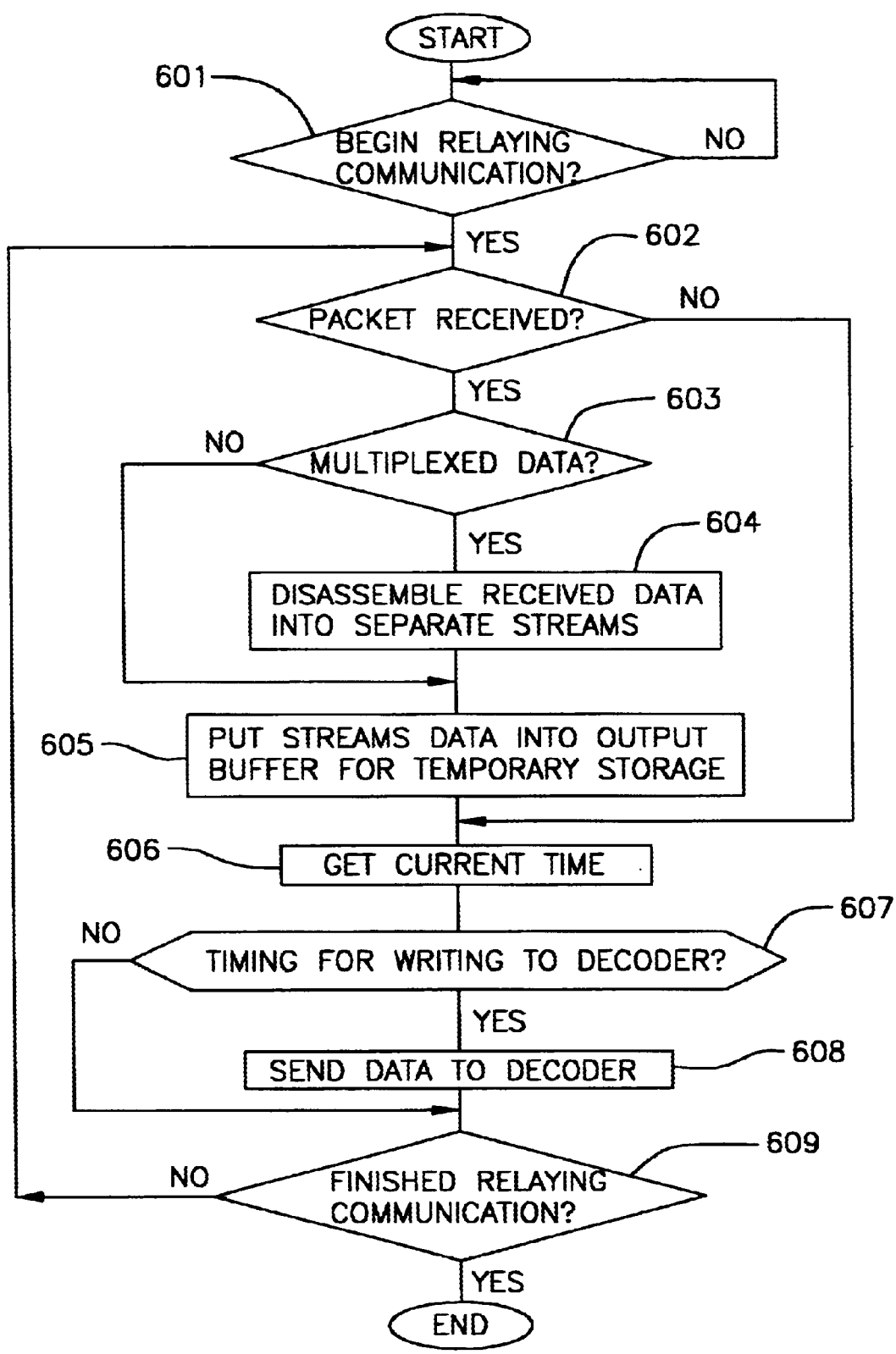
FIG. 6 is a flowchart of the operations performed by the communication relay process module of the gateway when sending data to the Internet.

FIG. 5 shows an example of the overall flow of operations in the communication relay process module 304 of the gateway 103. FIG. 6 shows the flow for operations involved in sending to the Internet 101.

In FIG. 5, the gateway 103 commences the communication relay process (step 501). At prescribed intervals, a check is made as to whether one or more sets of encoded data have been retrieved from the plurality of encoders 402 in the digital/analog converter 205 (step 502, yes). The one or more sets of data are placed in the input buffer 401 for temporary storage (step 503). If the retrieved data is the first stream bound for the destination gateway 103 (step 504, yes), a timing value is initialized for the multiplexing of subsequent streams to the same gateway (step 505). In step 504, if a stream bound for the same destination gateway 103 is already present, the current time is obtained (step 506). If the time matches the multiplex timing (step 507, yes), then the one or more sets of data obtained at step 502 is checked to see if it includes data for streams going to the same destination gateway 103. If such data exists (step 508, yes), this data to be multiplexed is retrieved from the input buffer 402 (step 509). The data to be multiplexed, obtained at step 509, is multiplexed into a single packet (step 510), and header data including at least a sequence number and a timestamp is added to the multiplex packet (step 511). The multiplex packet generated at step 511 is passed on to the outgoing process module 406 (step 512), and is sent to the Internet 101 using the TCP (UDP)/IP communication protocol (step 513). If the data obtained at step 502 does not contain data bound for the same gateway (step 508, no), then header data is added to this data and the resulting packet is passed onto the outgoing process module 406 without performing multiplexing (step 512), and the steps starting with the sending of the packet over the Internet (step 513) are performed. If some sort of release notification, such as from termination of the gateway processing program, is received (step 514, yes), the operations are terminated.

In FIG. 6, the gateway 103 commences the communication relay process (step 601) and checks for arrival of packets from the Internet 101. When a packet is received (step 602, yes), it is determined whether the received packet is a multiplexed packet or not. If the packet is a multiplexed packet (step 603, yes), the packet disassembly module 408 disassembles the packet into separate streams (step 604), and the stream data is placed in the output buffer 409 for temporary storage (step 605). The current time is obtained (step 606) and is saved until the timing to output to the decoder 410 is reached. When it is time to output (step 607, yes), the data is sent to the decoder 410, where it is decoded, and the digital data is converted to analog data (step 608). If, at step 603, the received packet is not a multiplexed packet (step 603, no), the operations starting at step 605 are performed.

In the audio data gateway according to this embodiment, packets are formed by multiplexing multiple streams bound for the same destination gateway. Thus, overhead from header data can be reduced and bandwidth can be used more efficiently.

Figure 7:
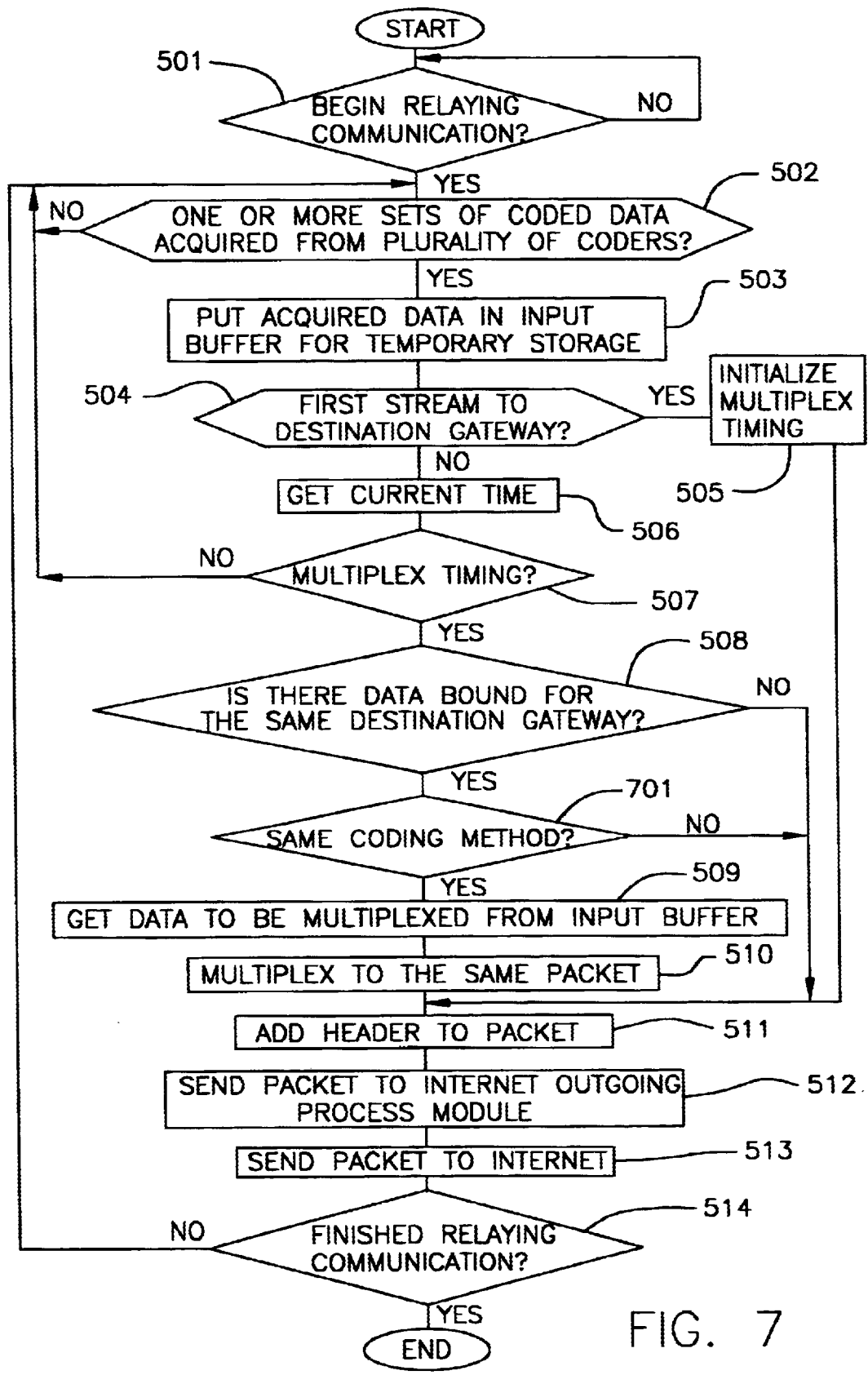
FIG. 7 is a flowchart of the operations performed by a communication relay process module according to the second embodiment when sending data to the Internet.

The following is a description of a second embodiment of the present invention, with references to FIG. 7.

In the audio data gateway according to this embodiment, a multiplexing unit for the streams to be multiplexed is added to the gateway 103 from the first embodiment. The overall structure of the system used to implement this format as well as the gateway operations and the like are the same as in the first embodiment (FIG. 1–FIG. 6).

FIG. 7 shows an example of the operation flow involved in the sending operations performed by the communication relay process module 304 of the gateway 103.

In FIG. 7, if there is data bound for the same destination gateway 103 at step 508 (step 508, yes), it is determined whether the same encoding method is used for these data. If there is data that uses the same encoding method (step 701, yes), this data will be multiplexed and the subsequent operations are performed.

In the audio data gateway according to this embodiment, of the multiple is streams bound for the same destination gateway, streams having the same encoding method serve as the unit by which multiplexing is performed. This makes it possible to simply prepare one header area where the encoding method is specified, thus preventing the need to place encoding method data in each data section. This provides further reduction in overhead.

Figure 8:
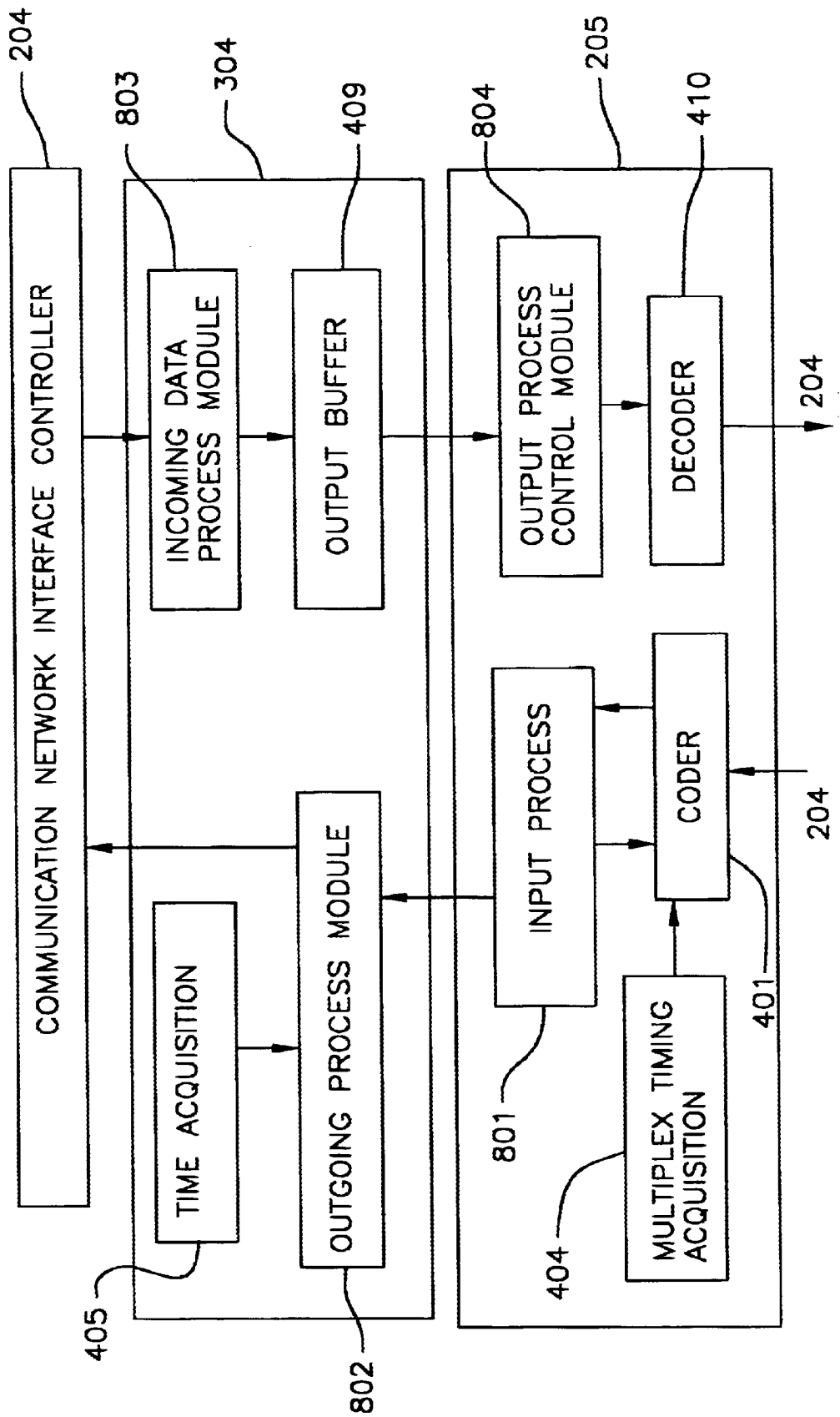
FIG. 8 is a structural drawing showing the connection establish module and the communication relay process module from a gateway according to the third embodiment.
Figure 9:
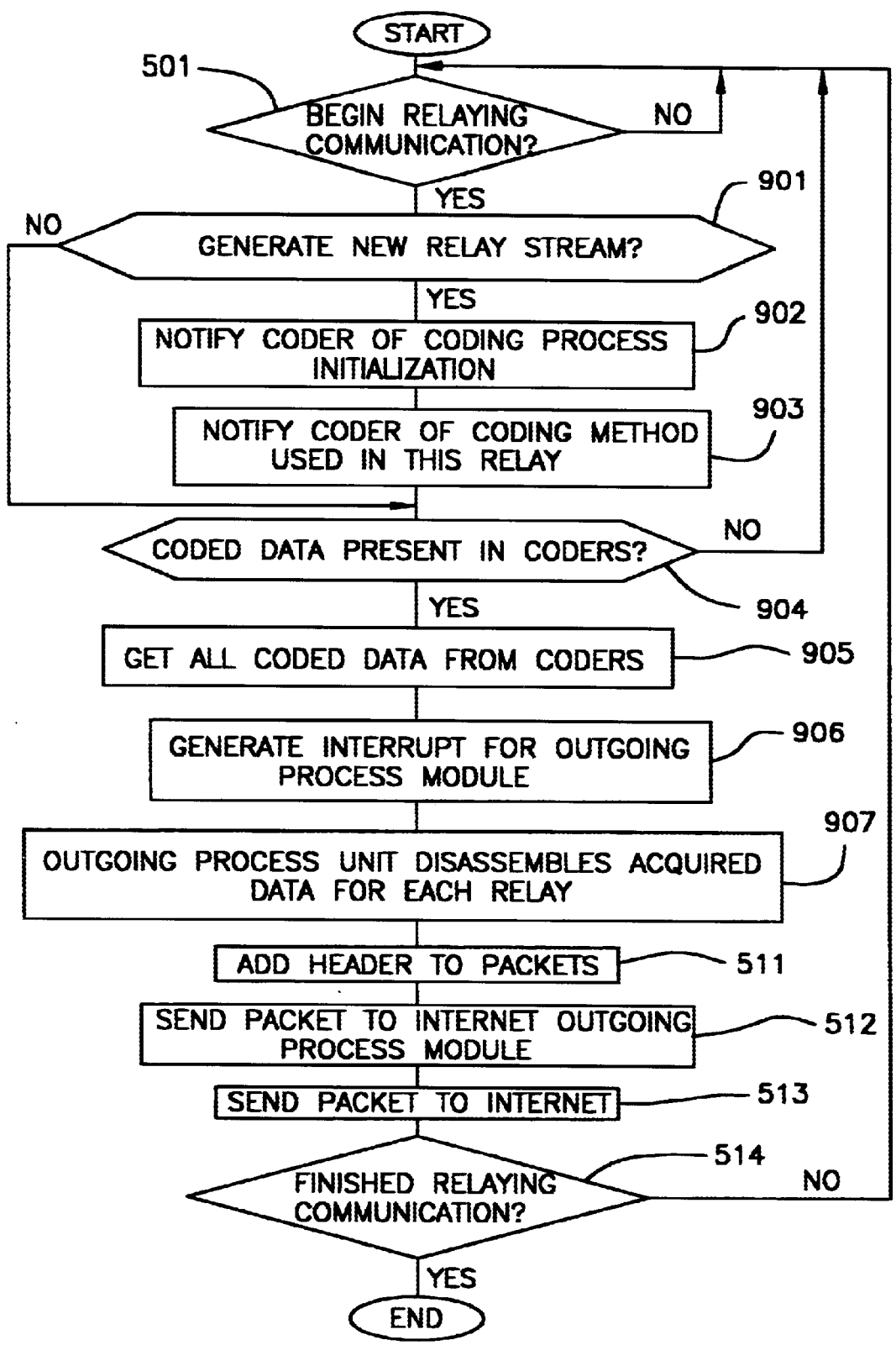
FIG. 9 is a flowchart showing the operations performed by the communication relay process module of the gateway according to the third embodiment.
Figure 10:
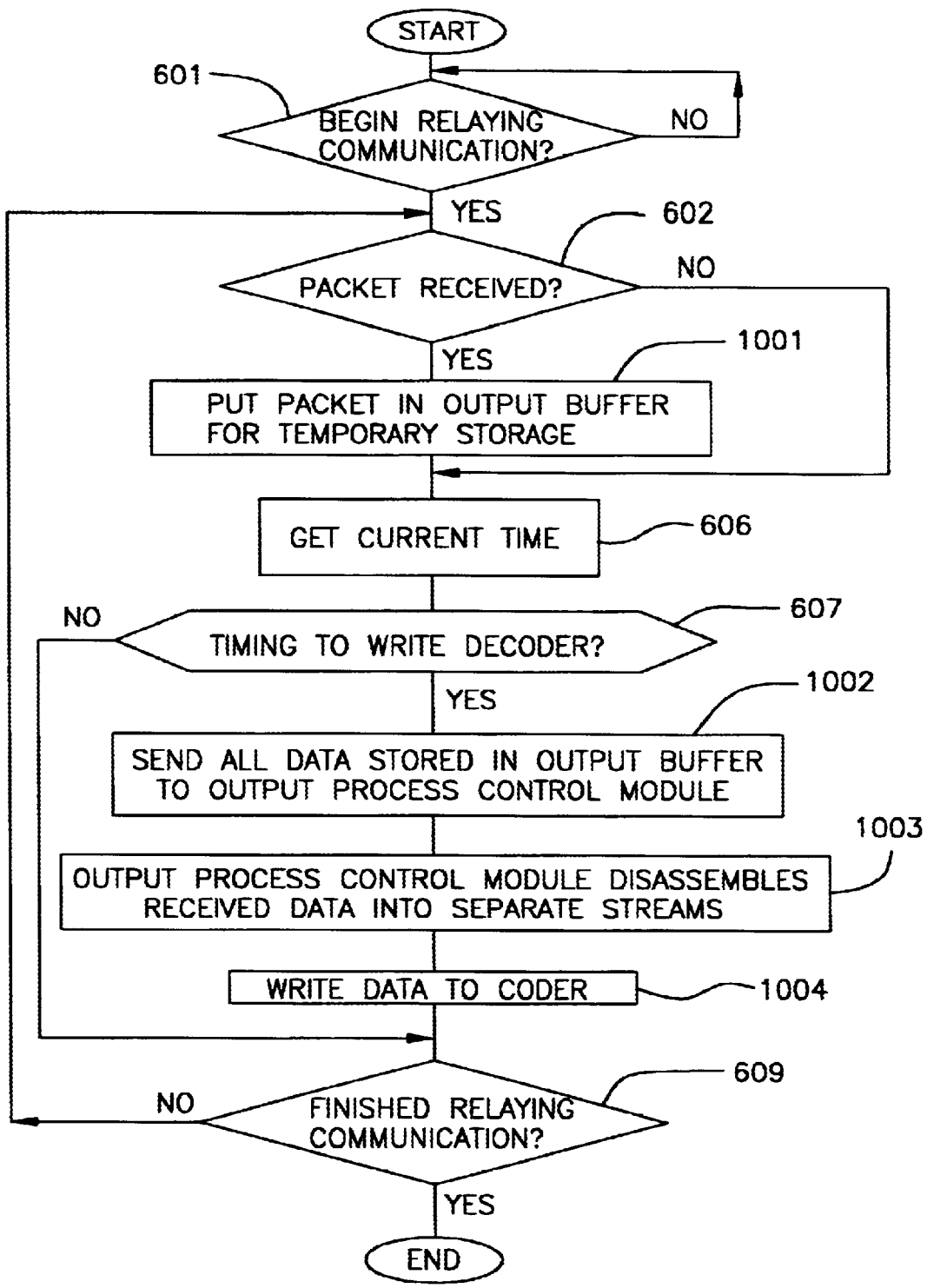
FIG. 10 is a flowchart showing the operations performed by the communication relay process module of the gateway according to the third is embodiment when receiving data from the Internet.

The following is a description of the third embodiment of the present invention, with references to FIG. 8–FIG. 10.

The audio data gateway according to this embodiment involves the gateway 103 of the first embodiment with the addition of a method for eliminating the number of input/output operations performed between the hardware and the higher-level software. This is achieved by having the higher-level software pass data to the digital/analog converter 205, which is implemented in hardware, all at once. The basic overall structure of the system in which this method is implemented, the operations performed by the gateway, and the like are the same as the first embodiment (FIG. 1–FIG. 6).

FIG. 8 shows the internal structure of the communication relay process module 304 and the digital/analog converter 205 from the gateway 103 of this embodiment.

In FIG. 8, there is shown: an outgoing process module 802 receiving multiplexed encoded audio data from the digital/analog converter 205, generating packets by adding header data, and performing sending operations to the Internet; an incoming data process module 803 receiving audio packets from the Internet; an input process control module 801 controlling batch input of multiplexed audio streams from the coder 401 to the digital/analog converter 205; and an output process control module 804 controlling batch output of incoming audio data from the output buffer 409 to the decoder 410.

FIG. 9 and FIG. 10 shows an example of the overall operation flow that takes place with the communication relay process module 304 from the gateway 103. FIG. 9 shows the flow of operations when sending to the Internet 101, and FIG. 10 shows the flow of operations when receiving from the Internet 101.

In FIG. 9, the gateway 103 begins communication relay operations (step 501). A check is made to see whether a new relay stream has been created. If a new relay stream has been created (step 901, yes), the input process control module 801 sends a message to the coder 401 used by the new relay stream to perform initialization operations (step 902) and informs the coder 401 being initialized of the encoding method (step 903). If encoded data is present in the coders 401 (step 904, yes), batch retrieval of data is performed from all coders 401 containing data (step 905). The input process control module 801 generates an interrupt (step 906) in the outgoing process module 802, which serves as the higher-level software. The outgoing process module 802 receiving the interrupt gets the data and disassembles it into streams (step 907). At step 511, header information is added to the data separated into streams. Then, operations to send the data to the Internet are performed.

In FIG. 10, the gateway 103 begins communication relay operations (step 601). When a packet is received (602, yes), the received packet is temporarily placed in the output buffer 409 (step 1001). When the timing for writing to the coder is reached (step 607, yes), the data stored in the output buffer 409 is passed on to the output process control module 804 all at once (step 1002). The output process control module 804 disassembles the received data into separate streams (step 1003), and the streams are written to their respective decoders 410 (step 1004).

In the audio data gateway according to this embodiment, the digital/analog converter 205, which performs its operations in hardware, is able to sends data as a single batch to the higher-level software. This reduces the number of input/output operations performed between the hardware and the higher-level software.

Figure 11:
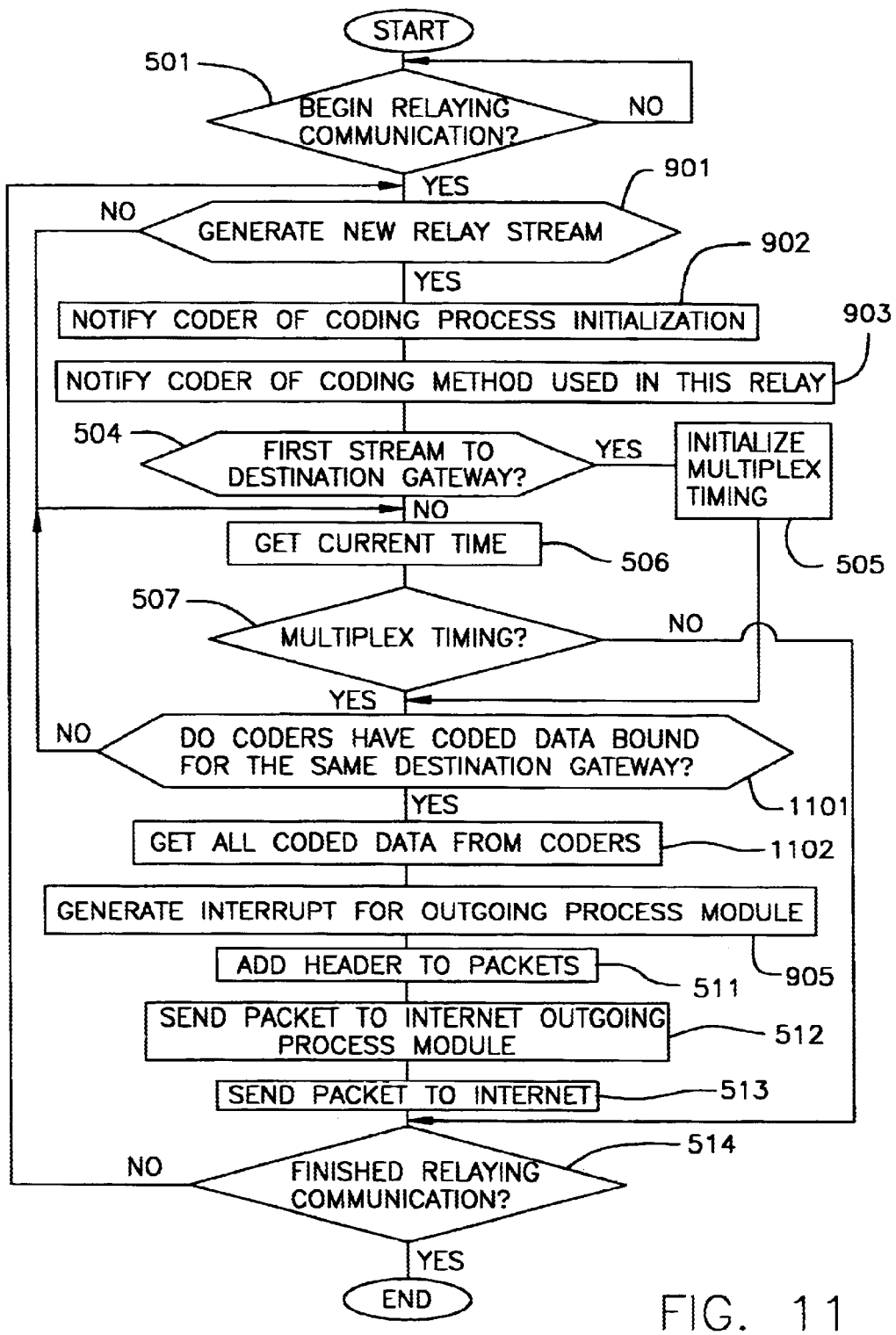
FIG. 11 is a flowchart showing the operations performed by the communication relay process module of the gateway according to a fourth embodiment when sending data to the Internet.

The following is a description of a fourth embodiment of the present invention, with reference to FIG. 11.

The audio data gateway device according to this embodiment involves the gateway 103 from the third embodiment along with the use of a multiplexing unit for the streams multiplexed in hardware. The basic overall structures of the system used for this system, the operations performed by the gateway, and the like are the same as the first embodiment (FIG. 1 through FIG. 6) and the third embodiment (FIG. 8 through FIG. 10).

FIG. 11 shows a sample flow for sending operations performed by the communication relay process module 304 of the gateway 103 according to this embodiment.

In FIG. 11, at step 507, if the multiplexing timing for streams bound for the same destination gateway is reached, the input process control module 801 determines if encoded data is present in the coders 401 used by the streams having the same destination gateway. If one or more sets of encoded data are present (step 1101, yes), the encoded data is retrieved all at once from these coders 401 (step 1102). An interrupt is generated in the outgoing process module 802 (step 905), and sending operations are then performed.

In the audio data gateway according to this embodiment, encoded data for multiple streams bound for the same destination gateway can be retrieved all at once. This reduces the input and output operations that are performed between the hardware and the software.

Figure 12:
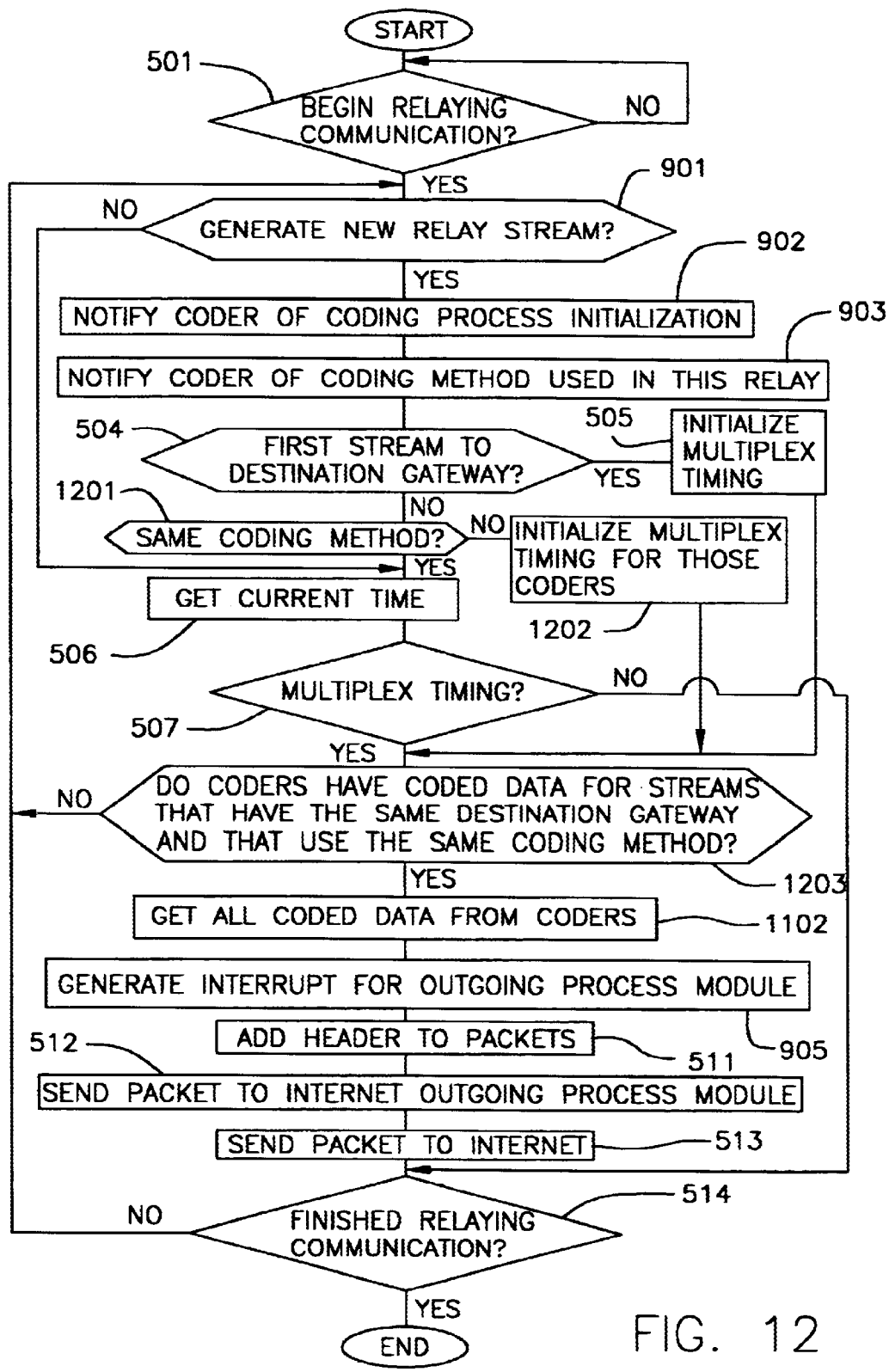
FIG. 12 is a flowchart showing the communication relay process module of the gateway according to a fifth embodiment when sending data to the Internet.

The following is a description of a fifth embodiment of the present invention, with reference to FIG. 12.

In the audio data gateway according to this embodiment, the encoding method is added to the multiplexing unit for streams to be multiplexed in hardware, and these features are added to the gateway 103 from the fourth embodiment. The basic overall structures of the system used, the operations performed by the gateway, and the like are the same as in the first embodiment (FIG. 1 through FIG. 6), the third embodiment (FIG. 8 through FIG. 10), and the fourth embodiment.

FIG. 12 shows a sample flow for transmission operations performed by the communication relay process module 304 of the gateway 103 of this embodiment.

In FIG. 12, when a new relay stream is created and it is not the first stream to a destination gateway at step 504 (step 504, no), the stream is checked to see if it uses the same encoding method as the other streams bound for the same destination gateway (step 1201, yes). If the encoding method matches, multiplexing is performed at the same multiplex timing as the other streams. If the encoding method differs from the method used by the other streams (step 1201, no), a new multiplex timing is generated for this encoding method, and initialization is performed (step 1202). Step 507 determines whether, for the multiplex streams for which multiplex timing has come up, encoded data is present in the coders 401 for the multiplex streams having the same destination gateway and encoding method. If encoded data is present in these coders 401 (step 1203, yes), the encoded data is retrieved all at once from the coders 401 containing encoded data (step 1102). Then, data transmission operations are performed.

With the audio data gateway according to this embodiment, encoded data from multiple streams having the same destination and using the same encoding method are retrieved from hardware all at once. This reduces the input/output operations performed between hardware and software, while also reducing the amount of header data added at the outgoing process module.

The following is a description of a sixth embodiment of the present invention, with references to FIG. 14 through FIG. 19.

In the audio data gateway system according to this embodiment, a control unit 1301 is added to the audio data gateway system according to the first embodiment, as shown in FIG. 1. The basic overall structures of the system used, the operations performed by the gateway, and the like are the same as in the first embodiment (FIG. 1 through FIG. 6).

The controller unit 1301 shown in FIG. 1 includes all the elements that are part of the gateway described above except for the digital/analog converter 205.

Figure 13:
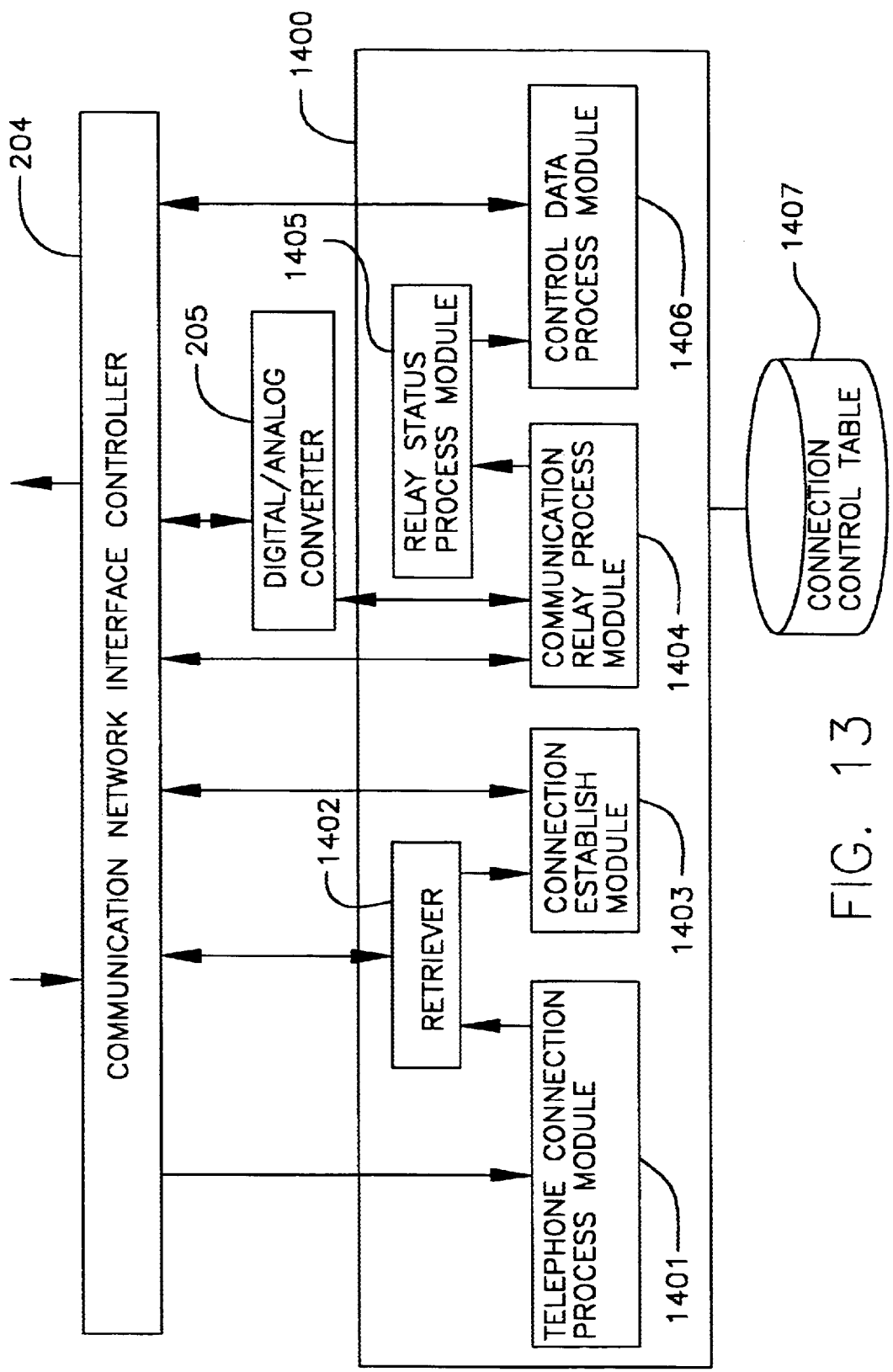
FIG. 13 is a structural drawing of the communication controller of a gateway according to the sixth embodiment.

In FIG. 13, a communication controller 1400 of the gateway 103 includes: a telephone connection process module 1401; a retriever 1402; a connection establish module 1403; a communication relay process module 1404; a relay status process module 1405; a control data process module 1406; and a connection control table 1407.

In a communication controller 1400, a telephone connection process module 1401 obtains the telephone number being called when the telephone 105 accesses the gateway via the public telephone network 102, and when a communication termination notification is received from the telephone 105 communication relay operations are halted and the connection is terminated. If a communication relay request is received, the retriever 1402 uses the phone number of the telephone 105 of the party being called to search the storage device 203 for the address of the gateway that handles the destination terminal. The connection establish module 1403 establishes the connection with the communication relay destination gateway. If a communication termination notification is received by the relay destination gateway 1301, communication relay operations are halted and the connection is terminated. The communication relay process module 1404 relays the audio data digitized by the digital/analog converter 205 to the gateway 103 for the communication relay destination. The relay status process module 1405 monitors factors relating to relay quality such as IP packet delays and packet loss and performs recalculations at fixed intervals. The control data process module 1406 receives control data such as scheduling data and communication relay parameters from the control unit 1301. The connection control table 1407 is a table that holds information such as the address of the relay destination gateway 103 for the audio data stream currently being relayed, whether this audio data stream is to be multiplexed or-not, which lines are being used, and which lines cannot be used.

The internal structure of the communication relay process module 1404 is the same as that of the communication relay process module 304 presented in FIG. 4.

Figure 14:
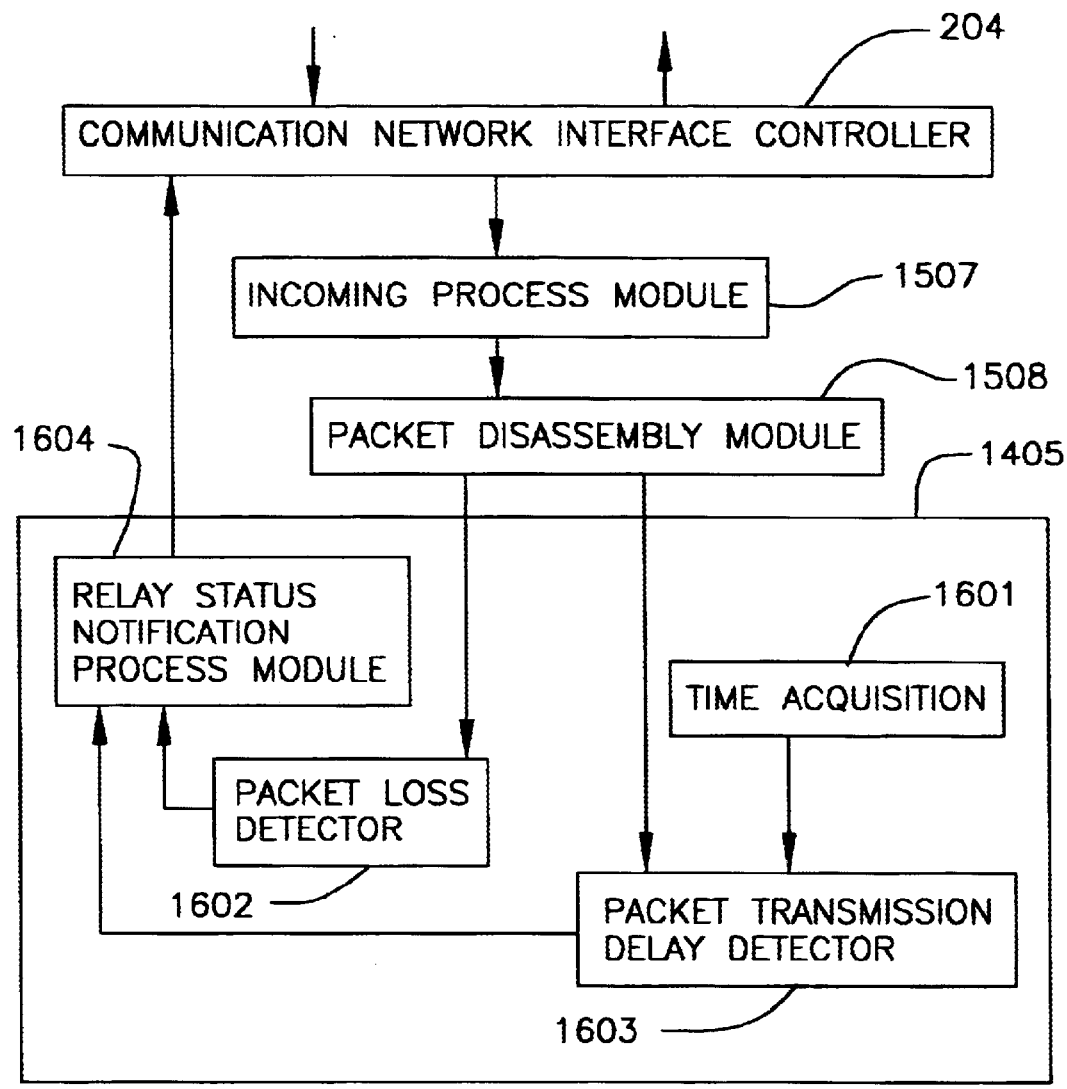
FIG. 14 is a structural drawing of the relay status process module of the gateway according to the sixth embodiment.

FIG. 14 shows the internal structure of the relay status process module 1405.

In FIG. 14, the relay status process module 1405 includes: a time retrieval module 1601 retrieving the current time; a packet loss detector 1602 detecting packet loss in the stream data the have been disassembled by the packet disassembly process module 1508 based on the IP packets received via the incoming process module 1507; a packet transmission delay detector 1603 determining if there is delay in these streams; and a relay status notification process module 1604 retrieving audio data relay status from the packet loss detector 1602 and the packet transmission delay detector 1603 and processing/generating data to notify the control unit 1301 of the relay status.

Figure 15:
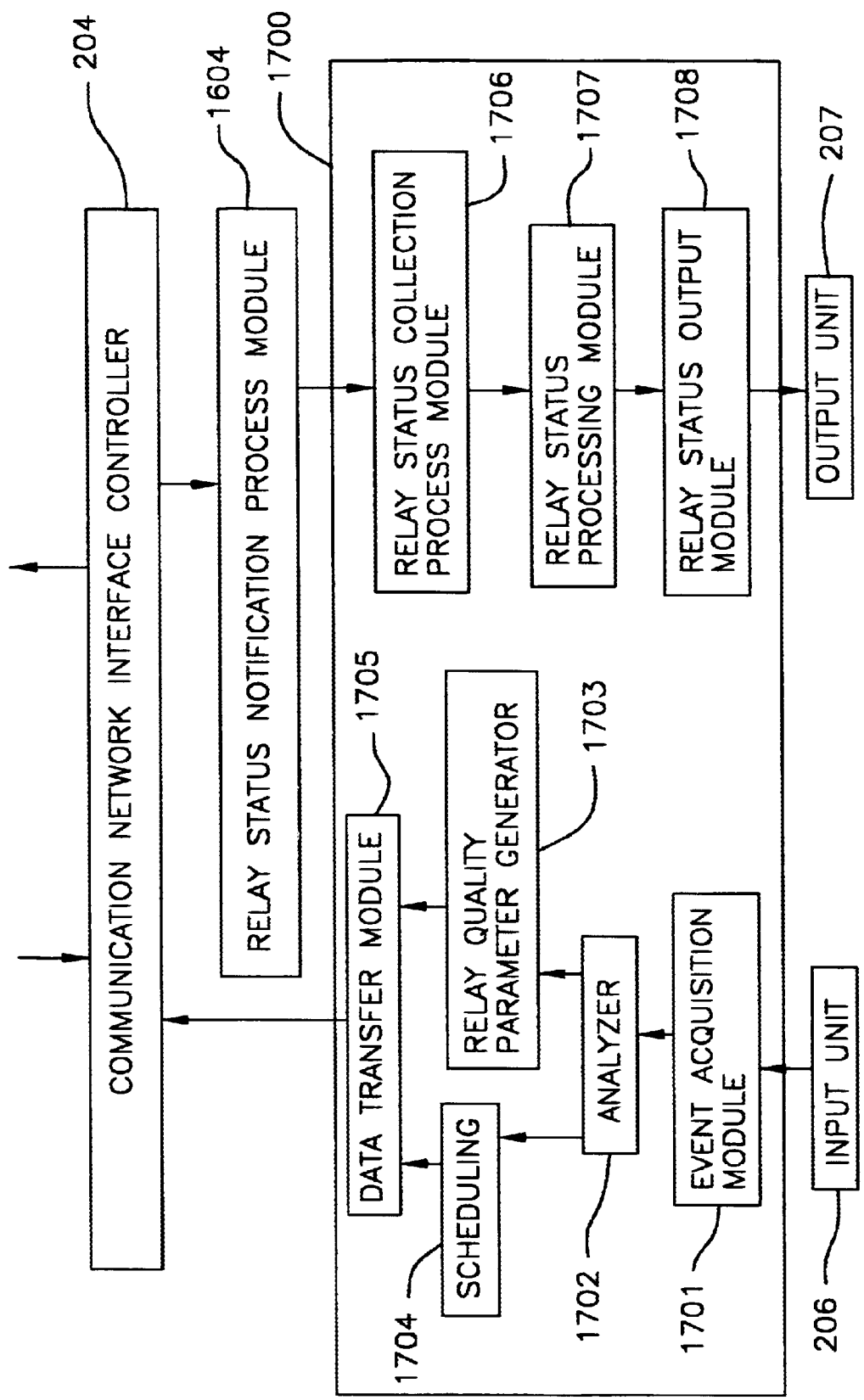
FIG. 15 is a structural drawing of the communication management module of the control device of the sixth embodiment.

In FIG. 15, a communication control module 1700 of the control unit 1301 includes: an event acquisition module 1701; an analyzer 1702; a relay quality parameter generator 1703; a scheduler 1704; a data transfer module 1705; a relay status collection process module 1706; a relay status processing module 1707; and a relay status output module 1708.

In the communication control module 1700, the event acquisition module 1701 retrieves events generated via the input device 206 by the administrator handling the control unit 1301. The analyzer 1702 analyzes the user input event retrieved by the event acquisition module 1701 and notifies appropriate processing modules based on the nature of the event. For example, if the event that is generated is a command to request a change in the operating schedule for the gateway 103, an operating schedule change request command is passed on to the schedule process module 1704, which performs scheduling. If the analyzer 1702 determines that an event is a command to the gateway 103 relating to relay quality, the relay quality parameter generator 1703 generates parameters representing the relay quality in response to requests. If the analyzer 1702 determines that an event is a command to the gateway 103 relating to scheduling, the schedule process unit 1704 generates a command to the gateway 103 for performing set-up, modifications, and the like of the schedule. If the data transfer module 1705 receives a request from the relay quality parameter generator 1703 or the schedule process unit 1704 to transfer data to a gateway 103, the data is sent to this gateway 103. The relay status collection process module 1706 receives relay status data that is sent from the gateways 103 at fixed intervals. The relay status processing module 1707 takes the IP packet relay status data for each gateway 103 collected via the relay status collection process module 1706 and analyzes and processes this data into a format that can be sent to an output unit 207. The relay status output module 1708 sends the data analyzed and processed by the relay status processing module 1707 to the output unit 207. For example, if a display is used as the output unit, the data is shown on the display.

FIG. 16 shows a sample format for the connection control table 1407.

In FIG. 16, the line number 1801 indicates the sequence number of the line being handled by the gateway. Column 1802 indicates whether the line is currently being Used or not. Column 1803 indicates whether the line is currently available. Column 1804 indicates the maximum communication relay delay for this line. Column 1805 indicates the port number used to send the digital audio data for this line. Column 1806 indicates the port number used to receive the digital audio data for this line. Column 1807 is an identifier for outgoing digital audio data streams. Column 1808 indicates the IP address for the relay destination gateway. Column 1809 indicates whether the digital audio data stream is a multiplex stream. Column 1810 is the identifier for the digital audio data stream. Column 1811 is the IP packet loss rate for the digital audio data stream. Column 1812 is the average communication delay for IP packets from the digital audio data stream. Column 1813 indicates the encoding method for the digital audio data. The loss rate 1811 and the average delay 1812 are recalculated at fixed intervals by the relay status process module 1405 and are sent to the control unit as relay quality status data.

Figure 17:
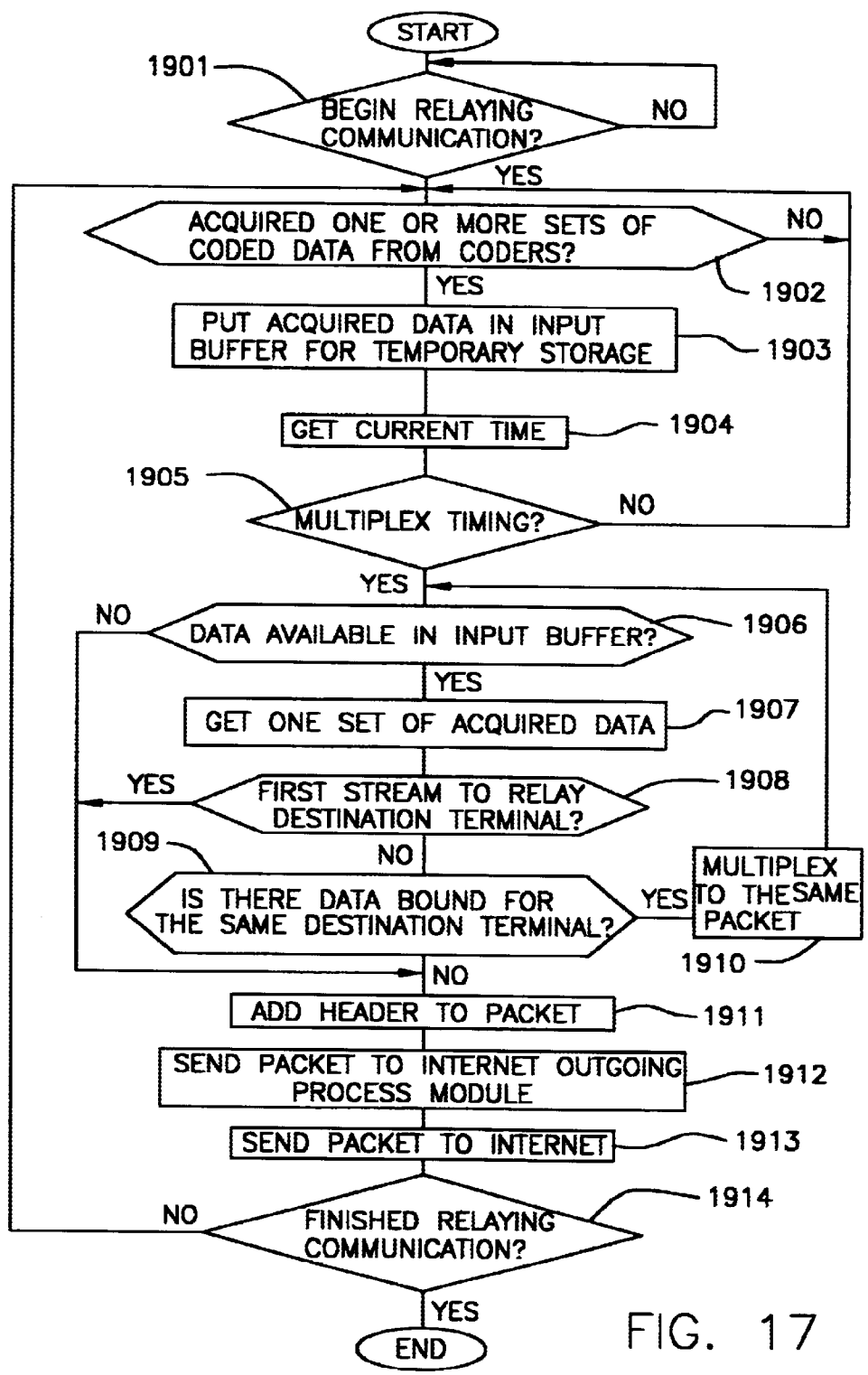
FIG. 17 is a flowchart of the operations performed by the communication relay process module of the gateway according to the sixth embodiment when sending data to the Internet.
Figure 18:
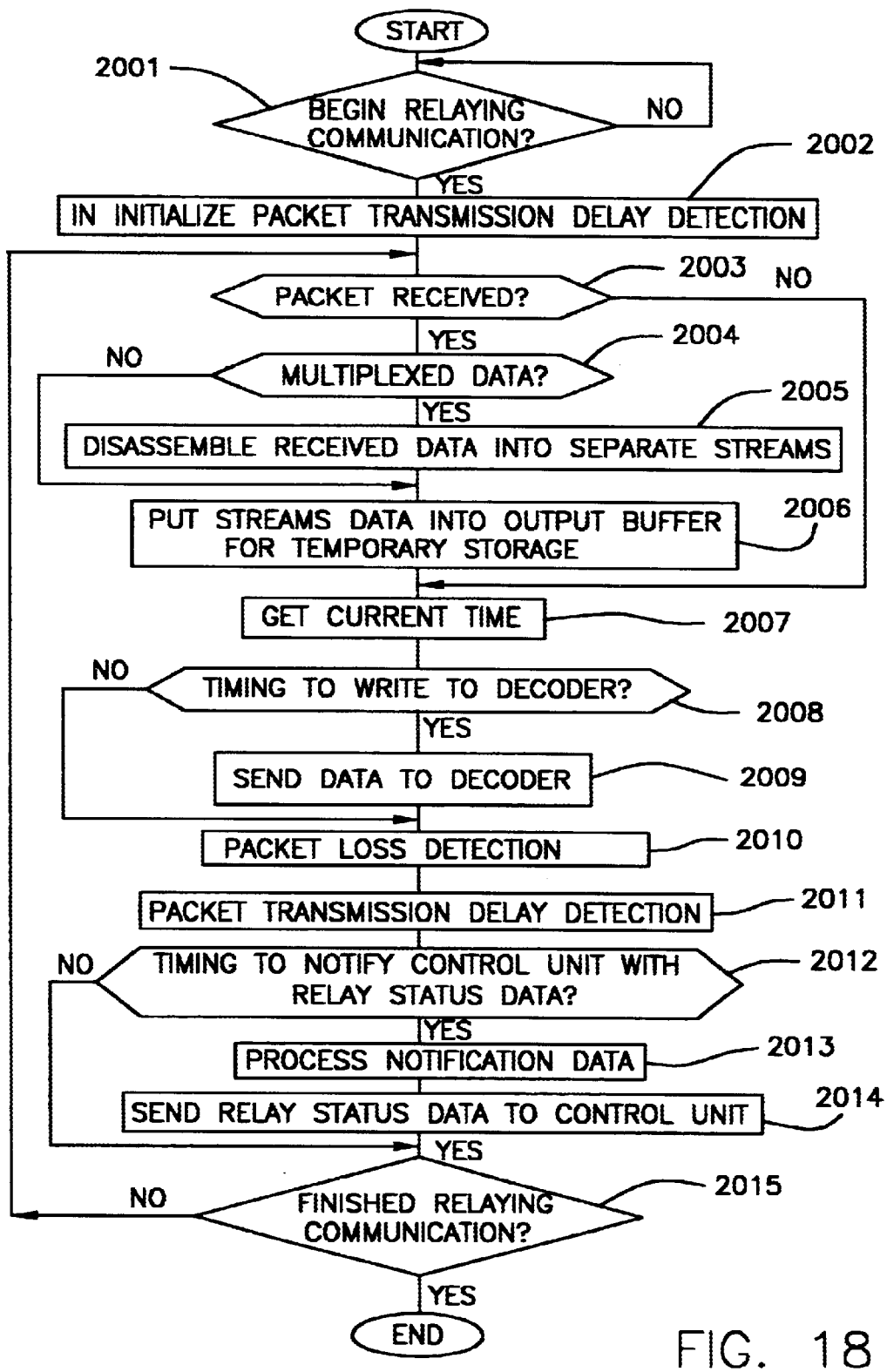
FIG. 18 is a flowchart of the operations performed by the communication relay process module of the gateway according to the sixth embodiment when receiving data from the Internet.

FIG. 17 and FIG. 18 show examples of operation flows for the communication relay process module 1404 of the gateway 103. FIG. 17 shows the flow of operations involved in sending data to the Internet 101. FIG. 18 shows the flow of operations involved in receiving data from the Internet 101.

In FIG. 17, the gateway 103 commences communication relay operations by starting up the gateway communication relay program stored in the storage device 203 and the like (step 1901). If encoded data is retrieved from the coders 1501 in the digital/analog converter 205, a determination is made as to whether the retrieved data contains multiple streams (step 1902, yes). If it does, the one or more sets of retrieved data are placed in the input buffer 1502 for temporary storage (step 1903). The current time is retrieved (step 1904), and if multiplex timing is reached (step 1905), a determination is made as to whether retrieved data is present in the input buffer 1502. If data is present, a single set of data is retrieved (step 1907). If the connection control table 1407 indicates that the retrieved data is the first stream bound for the relay destination gateway 103 (step 1908, yes), then a packet is generated by adding the address of the relay destination gateway 103 and headers relating to the outgoing audio data (step 1911). The packet generated at step 1911 is then passed to the outgoing process module 1506 (step 1912) and is sent over the Internet 101 using the TCP (UDP)/IP protocol (step 1913). If, at step 1908, a stream bound for the same destination gateway 103 is already present, a determination is made as to whether the data that has already been multiplexed into packets includes data from streams bound for the same relay destination gateway 103. If so (step 1909, yes), data is multiplexed into the corresponding packet (step 1910) and the operations starting at step 1906 are performed. If any sort of termination notification such as from termination of the gateway communication relay program or the like is received (step 1914, yes), the operations are terminated.

In FIG. 18, the gateway 103 begins communication relaying operations (step 201), initializes the reference value for evaluating packet delays from the Internet 101 (step 2002), monitors the Internet 101 for arriving packets, and waits for a packet to be received. When a packet is received (step 2003, yes), the received packet is checked to see if it is a multiplexed packet. If it is a multiplexed packet (step 2004, yes), the packet disassembly process module 1508 disassembles the packet into separate streams (step 2005), and the streams data is placed temporarily in the output buffer 1509 (step 2006). The current time is retrieved (step 2007), and the data is held until the timing for sending it to the coder 1510 is reached. When the output timing is reached (step 2008, yes), the data is sent to the coder 1510, where it is encoded and the digital data is converted to analog data (step 2009). The relay status process module 1405 determines if packet loss occurred based on information contained in the received packets, e.g., from sequence numbers and timestamps (step 2010). Then, packet delays are detected through comparison with the evaluation reference value set up at step 2002 (step 2011). When the arrival of the timing for relay status data notification to the control unit 104 is determined based on the current time obtained at step 2007, data indicating the packet loss and packet delay detected at step 2010 and step 2011 is prepared and updated with regard to the connection control table 1407 (step 2013). The data is then sent to the control unit 1301 (step 2014).

Figure 19:
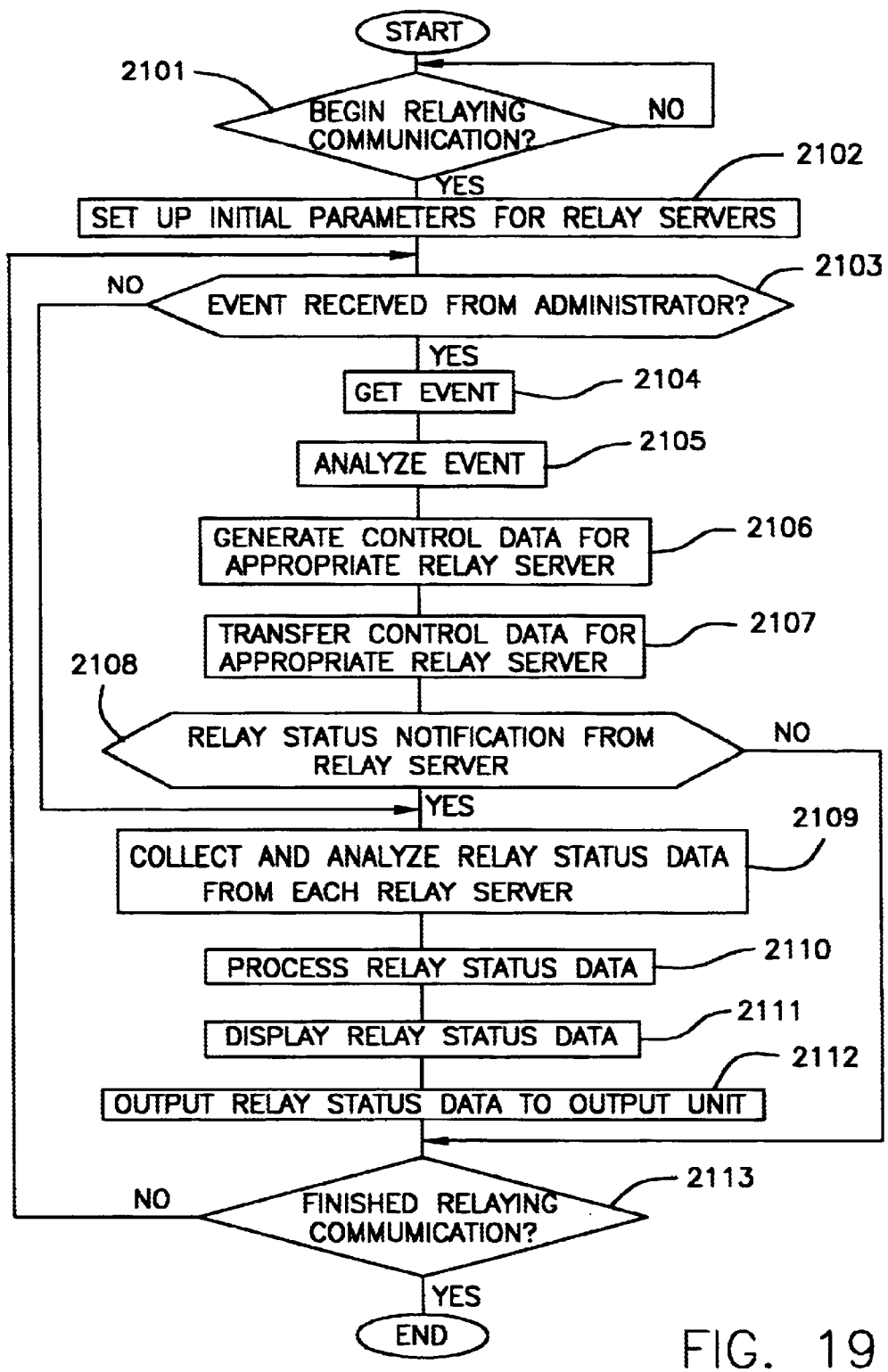
FIG. 19 is a flowchart of the operations performed by the control unit according to the sixth embodiment.

FIG. 19 shows an example of the flow of operations performed by the communication control module 1700 of the control unit 1301.

In FIG. 19, relay administration is commenced by having the audio relay control program stored in the storage device 203 started up and the like (step 2101). The control unit 1301 sets up and sends relay initialization parameters to the gateways 103 (step 2102). The relay parameters can include, for example: items related to scheduling such as temporarily halting relay operations at 2:00 am for maintenance; items related to relay quality such as communication delay tolerance settings for IP audio packets and reducing the number of lines supported by a gateway 103 that is exhibiting degraded relay quality; and other data necessary for administering the audio relay system. If an event is entered from the input unit 206 by the administrator operating the control unit 1301 (step 2103, yes), this event is retrieved (step 2104). The event obtained at step 2104 is analyzed (step 2105). Control data based on the nature of the event is generated for the gateway 103 included in the event, and header information needed for TCP/IP is added to form a packet (step 2106). The control data generated at step 2106 is sent to the gateway 103 by the data transfer module 1705 (step 2107). Also, monitoring is performed to see if relay status notifications have been received from the gateways 103. If relay status notification is received (step 2108, yes), the relay status data is collected and analyzed for each gateway (step 2109). The relay status data analyzed at step 2109 is processed to provide information necessary to the administrator running the control unit 1301 (step 2110). The processed data is then converted into a format that can be output to the output unit 207 of the control unit 1301. For example, if a display unit is used, the processed relay status data is formatted so that it can be handled by a display program (step 2111), and this data is sent to the output unit 207 (step 2112).

According to the audio data relay system of this embodiment, the control unit monitors the relay quality status for each gateway. When problems occur such as line trouble or a gateway going down, the scheduling and the like of each gateway can be controlled.

Figure 20:
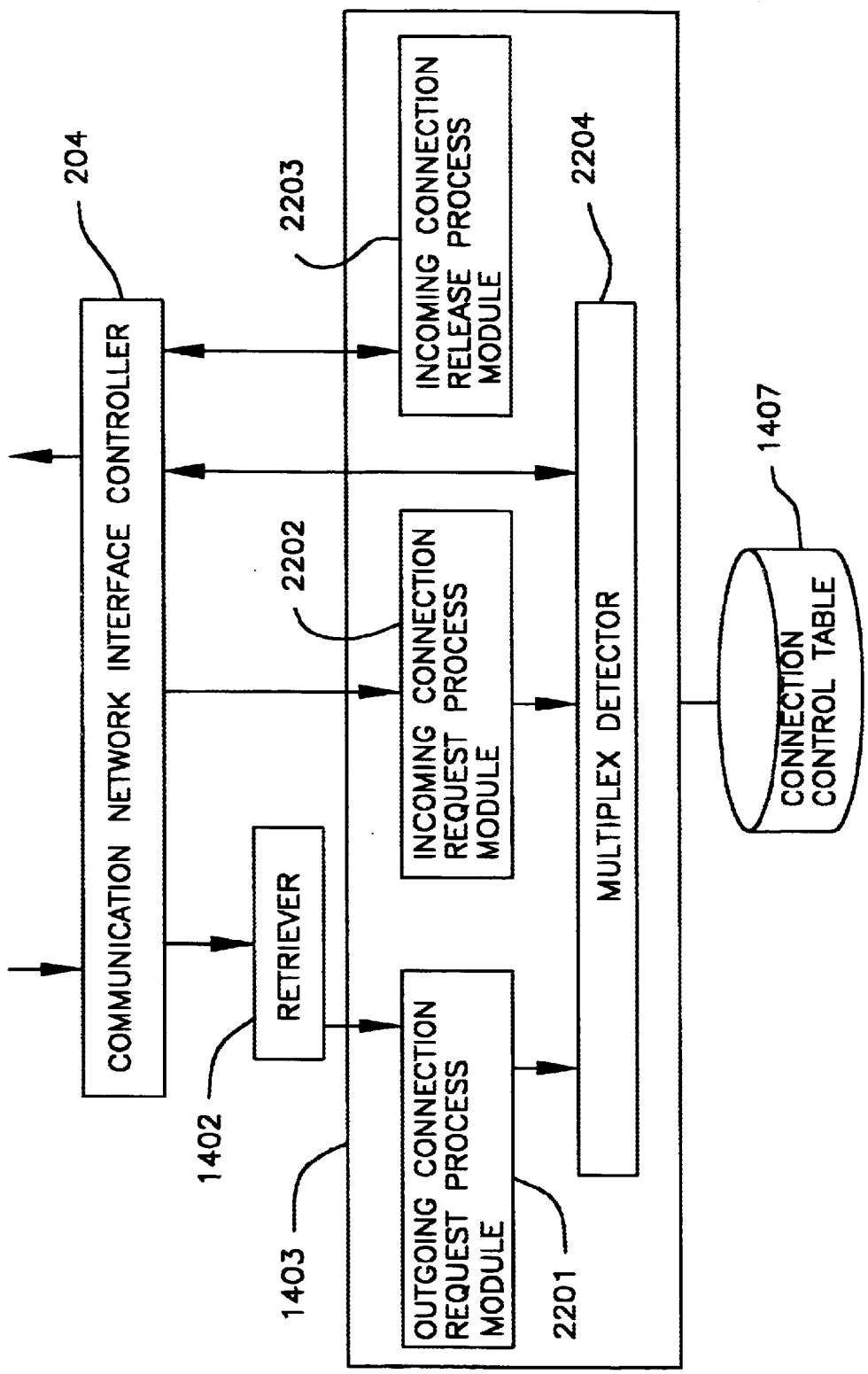
FIG. 20 is a structural drawing of the connection establish module of a gateway according to the seventh embodiment.
Figure 23:
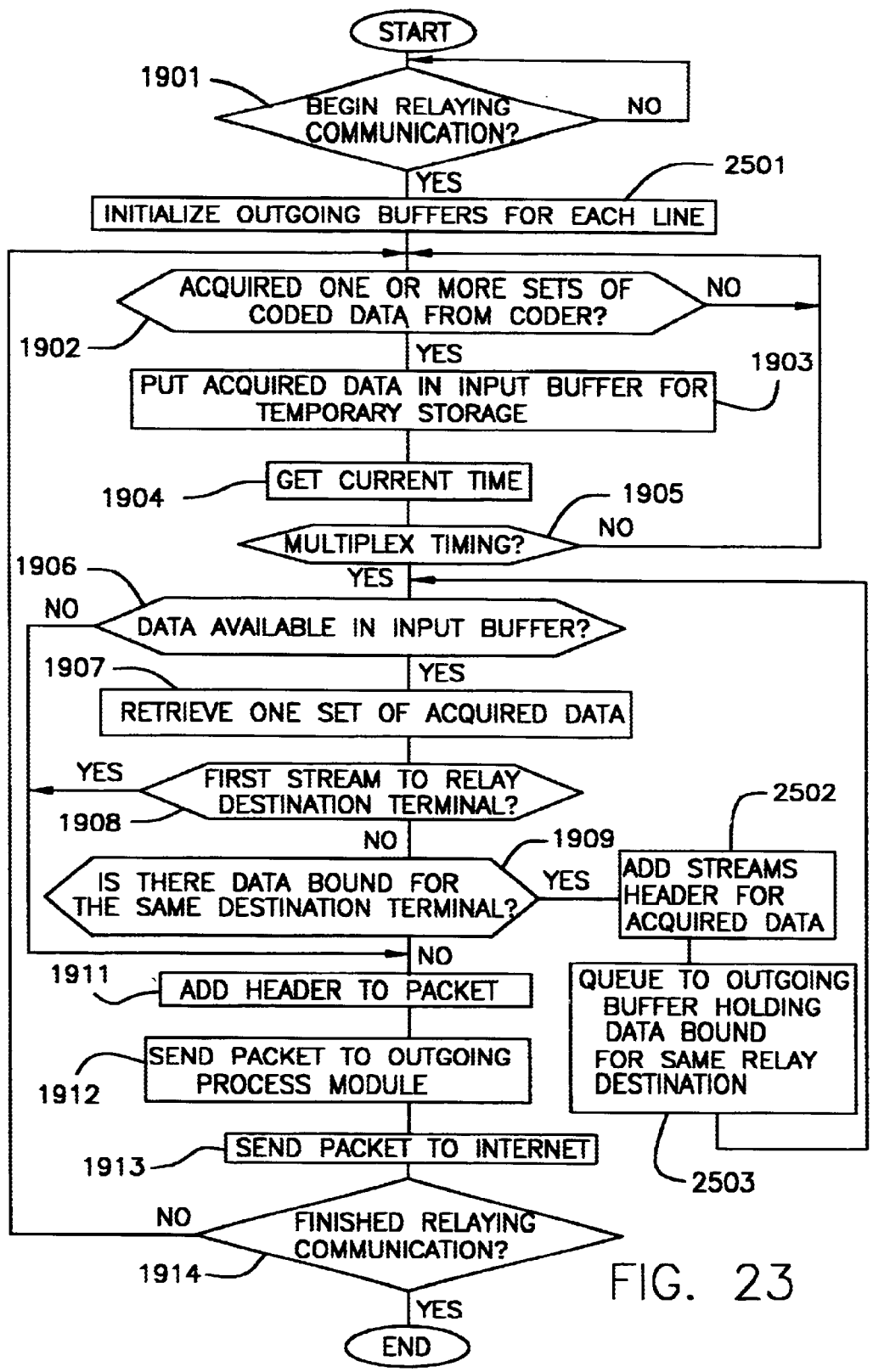
FIG. 23 is a flowchart of the operations performed by the communication relay process module of the gateway according to the eighth embodiment when sending data to the Internet.

The following is a description of the seventh embodiment of the present invention, with references to FIG. 20 and FIG. 23.

The audio data gateway according to this embodiment involves the gateway 103 from the first embodiment with an additional feature wherein, when an audio data gateway generates streams bound for the same relay destination, the gateway negotiates with the relay destination audio data gateway to see if the streams should be multiplexed or not. The overall structure in which this is implemented and the operations performed by the gateway and the control unit are the same as in the sixth embodiment.

FIG. 20 shows the internal structure of the connection establish module 1403 from the gateway 103 of this embodiment.

In FIG. 20, there is shown an outgoing connection request process module 2201 which, when the telephone connection process module 1401 receives a relay request from the telephone 105, obtains the address for the relay destination gateway 103 from the results of the search performed by the retriever 1402 for this gateway 103. The outgoing connection request process module 2201 uses this address to send a connection request to this gateway 103 via the Internet 101. An incoming connection request process module 2202 receives connection requests from a sending gateway 103. An incoming connection release process module 2203 receives a connection termination notification from either the telephone 105 connected to the local gateway 103 or the relay destination gateway 103 and performs operations to terminate the connection. When a new connection is established from either the outgoing connection request process module 2201 or the incoming connection request process module 2202, a multiplex detector 2204 determines whether the connection is to be established with multiplexing and performs negotiation with the relay destination gateway 103.

Figure 21:
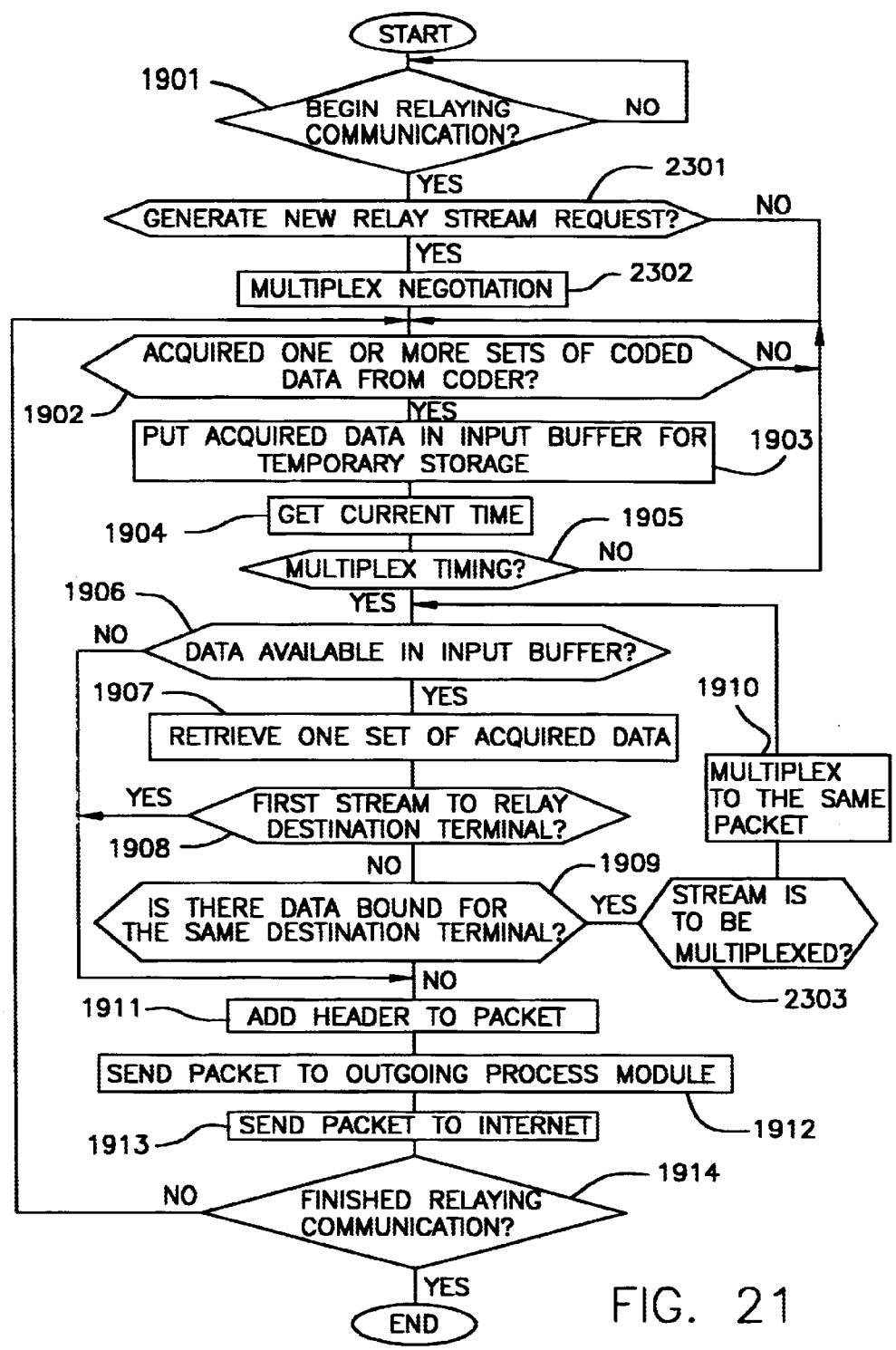
FIG. 21 is a flowchart of the operations performed by the connection establish module of the gateway according to the seventh embodiment when sending data.

FIG. 21 shows an example of the flow of operations performed by the connection establish module 1403 of the gateway 103 of this embodiment when sending data.

In FIG. 21, the communication relay process is commenced at step 1901. If a call comes in from a phone 105 and a new relay stream request is generated (step 2301, yes), negotiation takes place between the multiplex detector 2204 and the relay destination gateway 103 to determine whether to multiplex the stream or not (step 2302). At step 1909, if there is data bound for the same relay destination gateway 103 (step 1908, yes), then this stream is checked to see whether it is to be multiplexed or not. If it is to be multiplexed (step 2303, yes), the subsequent multiplexing operations are performed.

In addition to exchanging predefined commands, the negotiations for multiplexing may involve having the negotiation performed during the negotiation process for the audio data compression method or by including version information in the header of each IP packet.

In the audio data gateway according to this embodiment, negotiation is performed beforehand with the relay destination gateway 103 for each relay stream to determine if the relay stream is to be multiplexed. Thus, telephone calls can be relayed even with audio data gateways that do not support multiplexing.

The following is a description of an eighth embodiment of the present invention, with references to FIG. 22 through FIG. 26 and FIG. 31. The audio data gateway according to this embodiment involves the gateway 103 from the sixth or the seventh embodiment with the following addition: if multiplexed data is to be sent or received, the sending and receiving are performed using the UDP port assigned to one of the audio streams contained in the multiplexed data.

The overall structure in which this is implemented and the operations performed by the gateway, the control unit, and the packet formats are the same as in the sixth or the seventh embodiment.

Figure 22:
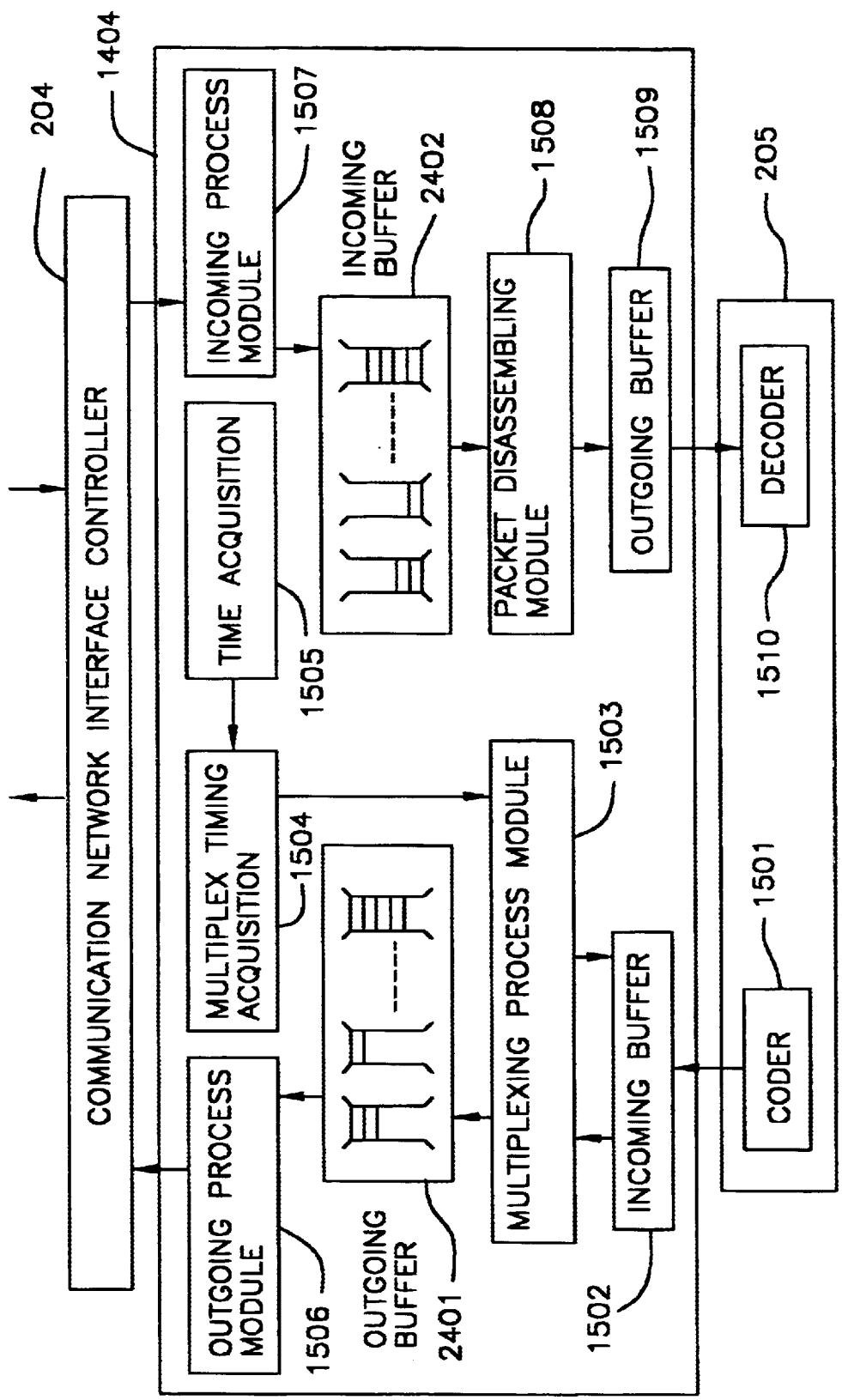
FIG. 22 is a structural drawing of the communication relay process module of a gateway according to the eighth embodiment.

FIG. 22 shows the internal structure of the communication relay process module 1404 of the gateway 103 from this embodiment. In FIG. 22, there are also shown outgoing buffers 2401. The number of the outgoing buffers 2401 corresponds to the number of lines handled by the local gateway 103 so as to provide sufficient capacity for multiple sets of audio data to be multiplexed, or, alternatively, corresponds to the number of gateways 103 installed in the audio data relay system for the multiplexed data. FIG. 22 also shows incoming buffers 2402 used for temporary storage of either multiplexed data or a single set of audio data received by the incoming process module 1507.

FIG. 23 shows an example of the flow of operations performed at the gateway 103 of this embodiment when sending data.

In FIG. 23, communication relay operations are commenced at step 1901. Outgoing buffers are initialized according to the number of lines handled by the local gateway 103 (step 2501). The size of an outgoing buffer for a line is set to a value such that there is no segmentation over the network. The number of sets of audio data that are buffered (multiplexed) in the outgoing buffer is not fixed since the packet unit sizes in a single stream can vary according to the encoding method used for the audio data. At step 1909, if it is found that the destination relay gateway 103 of the retrieved audio data is the same as that of another existing set of audio data, header information for the retrieved audio data is added (step 2502), and this audio data is queued to the outgoing buffer 2401 for the relay destination gateway 103 (step 2503). If the header information added to the audio data at step 2502 is based, for example, on the extended RTP format shown in FIG. 31, a sample header may include the following: a payload type 3507 containing the audio encoding method used for the audio data, e.g., "12" for G.723.1; a sequence number 3508 containing the packet sequence number starting with the start of audio data transmission; a timestamp 3509 containing the number of audio data samples since the start of audio data transmission; a SSRC 3510 containing an identifier for the party sending the audio data; and a size 3511 containing the data size for the audio data. In this case, the header information added at step 1911 would include the following six items defined in the RTP protocol: version information 3501; presence of padding 3502; presence of extensions 3503; number of contributing sources 3504; marker bit 3505; and presence of multiplexing 3506. At step 2503, the data to be multiplexed is queued to an outgoing buffer 2401. The outgoing buffer 2401 to which this data is queued for multiplexing at step 2503 is the outgoing buffer containing data that has already been queued and that is bound for the same relay destination. The new data is queued after the audio data that has already been processed. The multiplexed data is sent via the UDP port assigned to the relay stream corresponding to the outgoing buffer to which the data to be multiplexed is queued. Alternatively, the UDP port assigned to the last data to be multiplexed that was queued to the outgoing buffer could be used.

With regard to UDP ports, the ports to be used for sending and receiving can be set to the same values so that the same UDP ports can be used for sending and receiving regardless of whether the stream is multiplexed or not. The sending and receiving ports can be the same and do not have to be separate.

Figure 24:
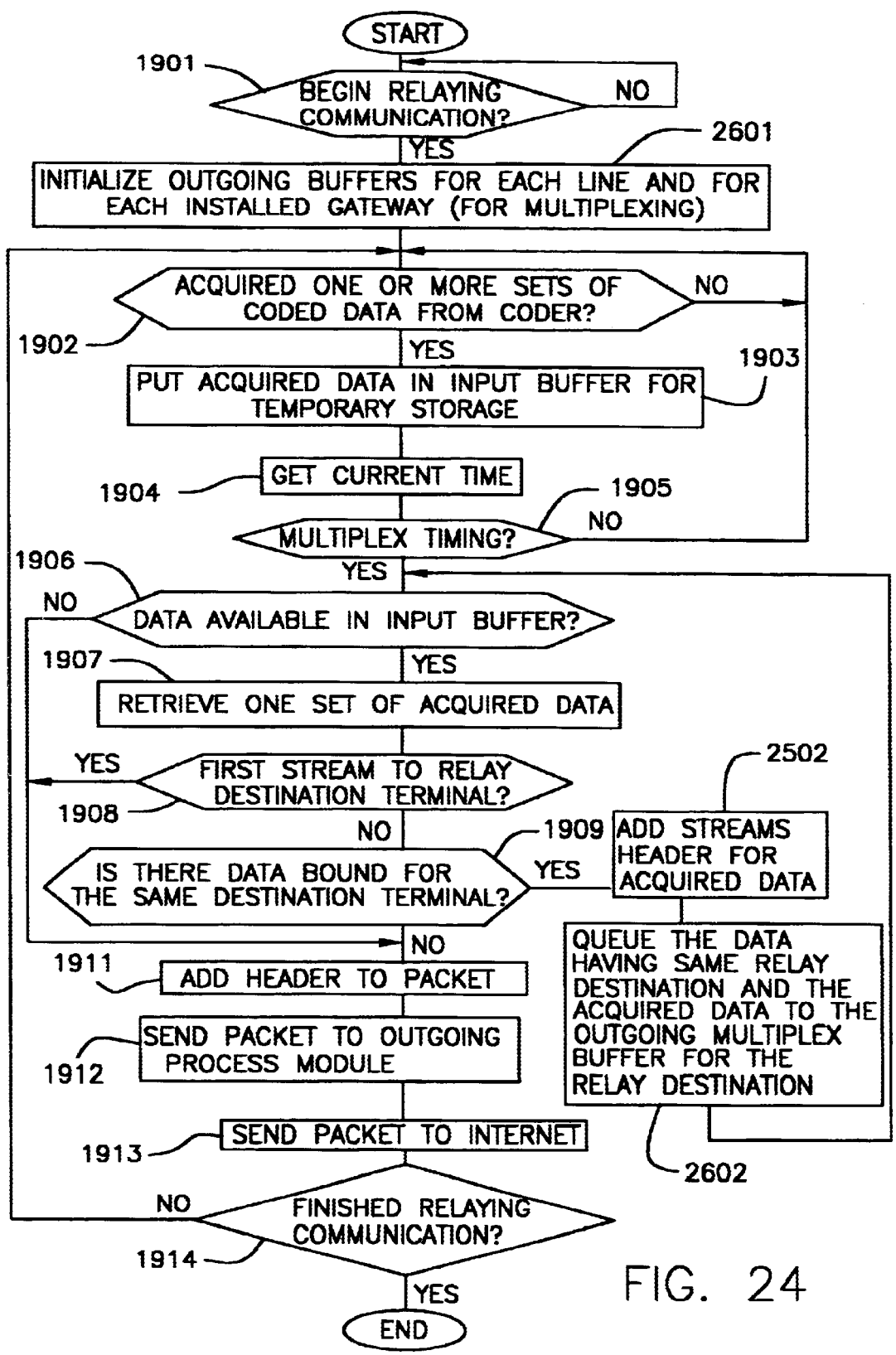
FIG. 24 is a flowchart of the communication relay process module of the gateway according to the eighth embodiment when sending data to the Internet.

FIG. 24 shows an example of the flow of operations involved for an alternate example of setting up the UDP port for sending multiplexed data from the gateway 103 of this embodiment. In this operation, UDP ports for multiplexed data are prepared for each gateway 103 installed in the audio data relay system. When multiplexed data is generated, the UDP port used for sending and receiving is switched from a port for non-multiplexed streams to a UDP port for multiplexed streams.

In FIG. 24, the communication relay operation is commenced at step 1901. An outgoing buffer 2401 is initialized for each line handled by the local gateway 103 and for each gateway 103 installed in the audio data relay system. Also, a UDP port is reserved for each outgoing buffer 2401 (step 2601). The correspondence between each port used for sending and receiving multiplexed data and the IP address of the relay destination audio data gateway for that port is saved. If, at step 1909, there is data bound for the same relay destination gateway 103 as the acquired data, header information for this acquired data is added to the data at step 2502. The data bound for the same destination gateway 103 found at step 1909 is sent to the multiplex outgoing buffer 2401 for the destination gateway 103. The acquired data is then queued to this same multiplex outgoing buffer 2401 (step 2602). If the acquired data is the third or later stream to be multiplexed, this means that there have already been two streams that have been sent to the outgoing buffer 2401. Thus, only the acquired data is queued.

With the audio data gateway according to this embodiment, when the sending method shown in FIG. 23 is used, there is no need for separate resources (ports, buffers) for multiplexing. The multiplexed streams can be relayed using the same resources as would be used when sending individual streams separately. With the sending method shown in FIG. 24, separate UDP ports are used for multiplexed streams and single streams. Thus, multiplexed streams can be given priority and bandwidth can be controlled more easily by using the port numbers assigned to the multiplexed streams.

The embodiments described above refer to using audio data but the present invention is not restricted to this and various types of digitized multimedia data such as video or data containing audio and video can be used as well.

The programs used to implement the embodiments described above can be stored in storage media such as floppy disks and CD-ROMs and distributed in these forms.

In the present invention, a gateway handling multiple lines performs multiplexing on multiple streams bound for the same destination gateway using common data such as header data. This reduces the bandwidth used and allows a greater number of lines to be handled. In addition, input and output operations performed between the hardware and the software for the multiplexing of streams are done all at once, thus allowing the number of input and output operations, which require CPU power, to be reduced.

Furthermore, if a stream relay request is generated between gateways, a gateway handling multiple lines can perform negotiation to determine if the stream can be multiplexed. Thus, single-stream connections with gateways that do not support multiplexing are possible.

Although preferred embodiments of the present invention have been described and illustrated, it will be apparent to those skilled in the art that various modifications may be made without departing from the principles of the invention.

What is claimed is:

1. A data gateway using in a communication system that includes a plurality of gateways for transferring data wherein:

each of said gateways includes:
means for obtaining addresses receiving data relay requests and information indicating relay destinations from other gateways, and using said relay destination address to find the closest gateway and obtain an address for the found destination gateway; means for establishing a connection request using said address for the found destination gateway; and means for relaying to said destination gateway packets created from data requested for relaying;

said relaying means includes: an input buffer for temporarily storing converted data from said created packets; means for acquiring time information; means for acquiring multiplex timing used to determine if a time acquired from said means for acquiring time information matches multiplex timing; and means for performing multiplexing operations acquiring all data stored in said input buffer when said multiplex timing based on said means for acquiring multiplex timing is reached and multiplexing streams having the same relay destination gateway into a single packet; and said means for performing multiplexing operations includes: means for sending said multiplexed packet to the Internet; means for receiving packets from said Internet; means for disassembling data received from said receiving means if said receiving data is determined to be said multiplexed packet; and an output buffer for temporarily storing separate streams data disassembled by said disassembling means.

2. In a communication system including an Internet, a public telephone network, telephones connected to said public telephone network, and a plurality of gateways disposed at access points between said Internet and said telephones for relaying telephone calls, a data gateway comprising:
means for acquiring addresses receiving from said telephone a call request and a phone number of a party being called, retrieving a gateway that is closest to said party being called using said phone number, and acquiring an address of the retrieved destination relay gateway;
means for establishing a connection request using said relay destination gateway address;
at least one means for converting analog audio data from said telephone into digital data and digital data received from said relay destination gateway into analog audio data when said relay destination gateway receives said connection request;

means for relaying packets formed from said converted digital data to said destination gateway;

means for receiving a connection termination notice issued either from a transmitting telephone accessing the local gateway or from a telephone of said party being called;

said means for relaying to said destination gateway including: an input buffer temporarily storing said converted data; means for acquiring time information; means for acquiring multiplex timing used to determine if a time acquired from said means for acquiring time information matches multiplex timing; and means for performing multiplexing operations acquiring all data stored in said input buffer when said multiplex timing based on said mean for acquiring multiplex timing is reached and multiplexing systems having the same relay destination gateway into a single packet; and said means for performing multiplexing operating: means for sending said multiplexed packet to said Internet; means for receiving packets form said Internet; means for disassembling data received from said receiving means if said received data is determined to be said multiplexed packet; and an output buffer for temporarily storing separate streams data disassembled by said disassembling means.

3. A data gateway as recited in claim 2 wherein:

said means for performing multiplexing operations of said gateways performs multiplexing on streams using the same encoding method for converting from analog audio data to digital data or on streams using the same sampling clock for audio data.

4. A data gateway as recited in claim 2 wherein said means for converting digital data and analog audio data further comprises:

means for notifying said means for converting digital data and analog audio data of multiplex timing acquired from said means for acquiring multiplex timing, wherein said means for acquiring multiplex timing operates on a plurality of encoded data;

means for acquiring data all at once if one or more sets of encoded data are present at multiplex timing; and means for controlling output operations taking all digital data to be decoded into analog audio data stored in said output buffer and sending said data to said means for converting said digital data to analog audio data corresponding to the stream in which said data is contained.

5. In an audio data relay system in which points on a public telephone network are connected via an Internet and audio data streams are converted into IP packets and relayed, said audio data relay system comprising:

an audio data gateway taking a plurality of audio data streams to be relayed and, if there are streams having a common IP destination addresses, adding multiplexed data, formed by multiplexing non-shared data from said streams having a common IP destination address, to said common IP address; and a control unit performing administration of said audio data gateway;

said audio data gateway including: a communication network interface controller performing operations to receive data from communication networks such as said public telephone network or said Internet and operations to send data to said communication networks; a telephone connection process module controlling communication with a telephone through said public telephone network; a retriever retrieving said audio data gateway at the relay destination using a phone number obtained from said telephone on the calling side; a connection establish module controlling connections via said Internet with said relay destination audio data gateway obtained from said retriever; a communication relay process module performing multiplexing and sending and receiving data via said Internet to and from said relay destination audio data gateway; wherein said relay processing module includes: an input buffer for temporarily storing the data; means for acquiring time information; means for acquiring multiplex timing used to determine if a time acquired from said means for acquiring time information matches multiplex timing; and means for performing multiplexing operations acquiring all data stored in said input buffer when said multiplex timing based on said means for acquiring multiplex timing is reached and multiplexing streams having the same relay destination gateway into a single packet, a relay status process module monitoring incoming data received from said communication relay process module; and a control data process module sending the relay status retrieved from the relay status process module to a communication controller and feeding back the data necessary for relay retrieved from the communication controller to a communication relay process module;

said communication controller including: an input unit; an output unit; a communication network interface controller sending and receiving data to and from said Internet; a communication management module analyzing events entered from said input unit, transferring data over said Internet if said input event is for transferring data to said audio data gateway, receiving data from said Internet form said audio data gateway, and processing said incoming date and sending it to said output unit; means for monitoring proper operation of each audio data gateway; means for periodically collecting audio data communication status between said audio data gateways; means for presenting said audio data communication status based on said collected data using output device; and means for obtaining administrative information for said audio data relay system via said input unit; and means for notifying said audio data gateways of said acquired information.

6. An audio data gateway system as recited in claim 5 wherein: said audio data communication status comprises one of the following: operating status of said audio data gateways; packet loss status for incoming packet; packet delay status; time at which call is received and terminated; phone number of user making call and phone number being called; or scheduling information for audio data gateways.

* * * * *